US012654449B2

(12) United States Patent
Shambley et al.

(10) Patent No.: US 12,654,449 B2
(45) Date of Patent: Jun. 16, 2026

(54) SERVICE STATION SERVING A PRINT HEAD

(71) Applicant: Beehive Industries, LLC, Centennial, CO (US)

(72) Inventors: William Shambley, Tyngsoboro, MA (US); Daniel Smith, Newport, KY (US); Daniel Tallman, Lawrenceburg, IN (US); Austin W. Brittain, Cincinnati, OH (US); Michael Pozderac, Mount Vernon, OH (US); Chris Michael, North Ogden, UT (US); Victor Fulton, Amelia, OH (US); Michael Bradley, Hamilton, OH (US)

(73) Assignee: BEEHIVE INDUSTRIES, LLC, Centennial, CO (US)

( * ) Notice: Subject to any disclaimer, the term of this patent is extended or adjusted under 35 U.S.C. 154(b) by 0 days.

(21) Appl. No.: 19/362,182

(22) Filed: Oct. 17, 2025

(65) Prior Publication Data

US 2026/0042295 A1    Feb. 12, 2026

Related U.S. Application Data

(63) Continuation    of    application    No. PCT/US2024/062139, filed on Dec. 27, 2024.
(Continued)

(51) Int. Cl.
*B29C 64/35*          (2017.01)
*B33Y 30/00*          (2015.01)
(Continued)

(52) U.S. Cl.
CPC .......... *B41J 2/16508* (2013.01); *B29C 64/35* (2017.08); *B33Y 30/00* (2014.12); *B33Y 40/00* (2014.12); *B41J 2/16502* (2024.05)

(58) Field of Classification Search
CPC .......... B29C 64/35; B33Y 30/00; B33Y 40/00
See application file for complete search history.

(56) References Cited

U.S. PATENT DOCUMENTS 5,574,485 A * 11/1996 Anderson ............ B41J 2/16552
                                                          134/1
2017/0100937 A1    4/2017 Ohnishi
(Continued)

FOREIGN PATENT DOCUMENTS

| CN | 107175827 | * | 9/2017 |
| CN | 21487278 | * | 11/2021 |
| WO | WO2020237122 | * | 11/2020 |

OTHER PUBLICATIONS

International Search Report and Written Opinion, International Patent Application No. PCT/US2024/062139, Mar. 18, 2025, 8 pgs.

*Primary Examiner* — Edmund H Lee
(74) *Attorney, Agent, or Firm* — LOZA & LOZA, LLP; Kevin L. Soules; Michael I. Angert

(57)                    ABSTRACT

An apparatus configured as a three-dimensional (3D) printer is disclosed. The apparatus includes a print head assembly, which includes a print head and a nozzle plate, the nozzle plate configured to dispense droplets of liquid provided from the print head. The apparatus includes a build bed configured to receive at least some of the droplets from the nozzle plate, and a service station. The service station includes a spittoon assembly configured to receive at least some of the droplets from the nozzle plate, a vacuum knife assembly configured to remove at least one of: debris, or at least some of the droplets from a surface of the nozzle plate, and a non-contact wash assembly comprising a plurality of weirs configured to upwell a washing fluid and immersively receive the nozzle plate in the washing fluid.

16 Claims, 20 Drawing Sheets

Related U.S. Application Data

(60)  Provisional application No. 63/615,590, filed on Dec. 28, 2023.

(51)  Int. Cl.
      *B33Y 40/00*     (2020.01)
      *B41J 2/165*     (2006.01)

(56)  References Cited

U.S. PATENT DOCUMENTS

| | | |
|---|---|---|
| 2018/0304634 A1 | 10/2018 | Hussain et al. |
| 2021/0245510 A1 | 8/2021 | Rosenberg et al. |
| 2021/0331478 A1 | 10/2021 | Qian et al. |

* cited by examiner

SERVICE STATION SERVING A PRINT HEAD

CROSS-REFERENCE TO RELATED APPLICATIONS

This application for patent is a continuation of and claims the benefit of International Application No. PCT/US2024/062139, filed in the United States Receiving Office on Dec. 27, 2024, which claims the benefit of United States Provisional Patent Application Number 63/615,590, filed in the United States Patent and Trademark Office on Dec. 28, 2023, both entitled "Service Station Serving A Print Head," the entire content of both applications is incorporated herein by reference as if fully set forth below in its entirety and for all applicable purposes.

TECHNICAL FIELD

Aspects described herein are generally related to three-dimensional (3D) printers and are more particularly related to a service station serving a print head of a 3D printer.

BACKGROUND

Printing aerosol can foul the face of a print head used in connection with at least print heads that print over powder (e.g., metal and ceramic powder used in an additive three-dimensional (3D) printing process). Aerosol from print head purging can float to other parts of the 3D printer, creating a buildup of powder and binder residue. Fouling the face of the print head may make jets of the print head inaccurate, causing surface finish and accuracy defects. Powder ejected from the build bed due to static forces or ballistic impact can get onto the face of the print head, causing similar issues. The residue left from cleaning the face of the print head can accelerate the above problems. Once there is any substantial buildup on the face of the print head, the problem accelerates as more powder and liquid adhere to the fouling on the face of the print head.

Most print heads have faces that have a non-wetting coating, which can be damaged by wiping with a dry or dirty implement. Wiping powder across the face of the print head can push grains into the nozzle plate, causing blockages. Imbalanced vacuum flow from a service station leaves some heads in a print head array cleaner than others. Resin from the binder, if not cleaned, can dry on the face or in the nozzles, causing clogs, creating low-quality parts, or canceling jobs.

Cleaning of a service station (configured to clean print heads, for example, of a 3D printer) may be difficult if powder and binder residue sets (e.g., cures, hardens). Difficulties exist in connection with the use of automated service station cleaning during the operation of a 3D printer building metal and ceramic parts, at least because many 3D printers using metal and ceramic powder are operated at high temperatures in vacuum chambers. Some wash stations may be available; however, biological growth has been detected in the washing fluid of some wash stations. Accordingly, scientists and engineers continue to search for ways to expedite the printing of 3D printed parts and improve the cleaning of print heads during the building of one or more parts in a 3D printer, such as, but not limited to, a binder jet 3D printer.

BRIEF SUMMARY OF SOME EXAMPLES

The following summary is provided to facilitate an understanding of some of the innovative features unique to the examples disclosed and is not intended to be a full description. A full appreciation of the various aspects of the examples can be gained by taking the entire specification, claims, drawings, and abstract as a whole.

According to one example, an apparatus configured as a three-dimensional (3D) printer may be described. The apparatus includes a print head assembly comprising a print head and a nozzle plate, the nozzle plate configured to dispense droplets of liquid provided from the print head; a build bed configured to receive at least some of the droplets from the nozzle plate; and a service station. The service station may include a spittoon assembly configured to receive at least some of the droplets from the nozzle plate; a vacuum knife assembly configured to remove at least one of: debris, or at least some of the droplets from a surface of the nozzle plate; and a non-contact wash assembly comprising a plurality of weirs (e.g., low dams) configured to upwell a washing fluid and immersively receive the nozzle plate in the washing fluid (e.g., be configured to immerse the nozzle plate in the washing fluid by action of the upwelling of the washing fluid in a given weir).

These and other aspects will become more fully understood upon a review of the detailed description which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

The accompanying figures, in which like reference numerals refer to identical or functionally similar elements throughout the separate views and which are incorporated in and form an object of the specification, further illustrate the examples and, together with the detailed description, serve to explain the aspects disclosed herein.

DETAILED DESCRIPTION

Figure 1:
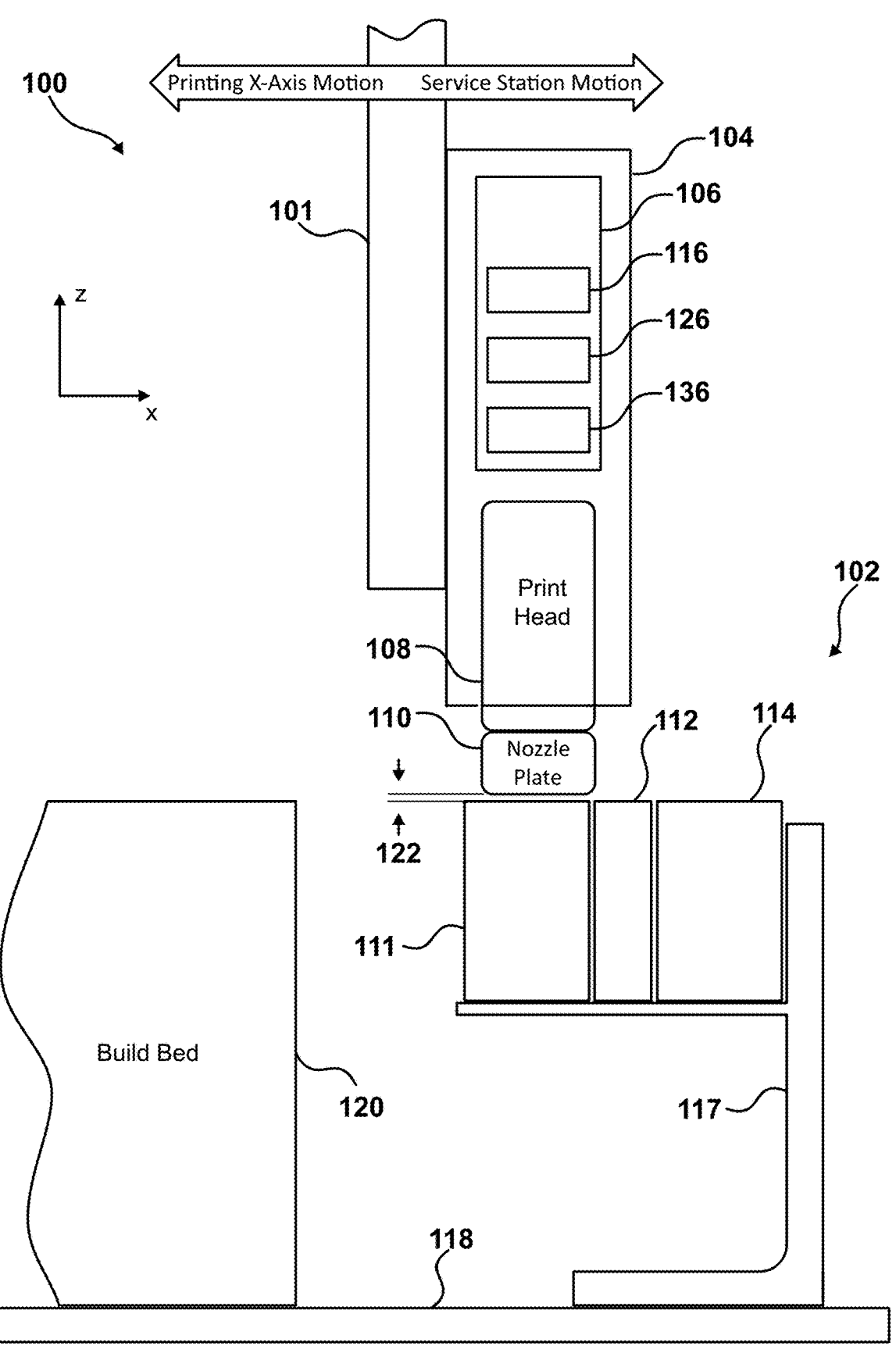
FIG. 1 is a block diagram representative of a three-dimensional (3D) printer, including a service station, according to some aspects of the disclosure.

The particular values and configurations discussed in the following non-limiting examples can be varied and are cited merely to illustrate one or more examples and are not intended to limit the scope thereof.

Examples will now be described more fully hereinafter with reference to the accompanying drawings. The examples disclosed herein can be modified within the scope of this disclosure and should not be construed as limiting; instead, these examples are provided so that this disclosure will be thorough and complete and fully convey the scope of the disclosure to persons of ordinary skill in the art. Like numbers refer to like elements throughout.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to persons having ordinary skill in the art that these concepts may be practiced without these specific details. In some examples, well-known structures and components are shown in block diagram form in order to avoid obscuring such concepts.

The terminology used herein is for the purpose of describing particular examples only and is not intended to be limiting. As used herein, the singular forms "a," "an," and "the" are intended to include the plural forms as well unless the context clearly indicates otherwise. It will be further understood that the terms "comprise" and/or "comprising," when used in this specification, specify the presence of stated features, integers, steps, operations, elements, and/or components but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one example," as used herein, does not necessarily refer to the same example, and the phrase "in another example," as used herein, does not necessarily refer to a different example. It is intended that the scope of disclosure may encompass the subject matter of one or more examples in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that particular examples described herein are shown by way of illustration and not as limitations. Aspects described herein can be employed in various examples without departing from the scope of the disclosure. Those persons having ordinary skill in the art will recognize or be able to ascertain, using no more than routine experimentation, numerous equivalents to the specific aspects and procedures described herein. Such equivalents are considered to be within the scope of this disclosure and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" (e.g., A and/or B contemplates A and B, or A, or B) unless explicitly indicated to refer to alternatives only or the alternatives are mutually exclusive; however, the disclosure supports a definition that refers to only alternatives and "and/or." Throughout this application, the term "about" is used to indicate that a value includes the inherent variation of error for the device, the method being employed to determine the value or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The persons having ordinary skill in the art will understand that there is generally no limit on the number of items or terms in any combination unless otherwise apparent from the context.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense unless otherwise explicitly indicated. For example, "a or b" may include a only, b only, or a combination of a and b. Similarly, a phrase referring to A and/or B may include A only, B only, or a combination of A and B (i.e., the '/' character may be used to represent the word 'or').

All of the aspects disclosed and claimed herein can be made and executed without undue experimentation in light of the present disclosure. While the aspects have been described in terms of preferred examples, it will be apparent to those of skill in the art that variations may be applied to the aspects described herein without departing from the concept, spirit, and scope of the disclosure and claims. All such similar substitutes and modifications apparent to those skilled in the art are deemed to be within the spirit, scope, and concept of the disclosure as defined by the appended claims.

A binder jet 3D printer is a type of 3D printer that may employ a liquid binding agent to build a 3D part layer by layer (slice by slice). A binder jet 3D printer may generate thousands of drops per layer, for thousands of layers per day, and must remain clean to perform well over a year or more of service. It may cost over $30,000 to replace a binder jet 3D printer print head array after a loss of a set of print heads. Today, print heads may be cleaned by manual wiping either with a wetted lint free cloth/wipe, rubber squeegee blade, or soft sponge material that does not apply much force to the nozzle plate and may rotate, translate, or unspool so that debris collected from the nozzle plate does not drag along the surface of the nozzle plate and cause damage. These cleaning products may either be one-time use, as in the example of a lint free paper wipe or may be a longer term consumable that gets rinsed or cleaned between services. In general, a cleaning of this type may require a linear motion component to move the cleaning product along a length of the nozzle plate(s). This translation is what takes extra time. Servicing the nozzle plate(s) in today's manner may waste 30-90 seconds per cleaning. Improperly maintained service stations can contaminate the print heads and ink system with washing fluid, biological growth, and particles from the powder bed.

Reducing the time and improving the quality of servicing print heads for binder jet 3D printers can prevent $100,000s per year per printer in maintenance, as well as increasing system productivity by as much as 50%. Clean heads also create smoother printed parts, reducing manual labor in part finishing and further improving throughput and profit margin.

Aspects described herein relate to the cleaning and maintenance of a binder jet 3D printer print head without stopping the motion of a gantry to service the print head coupled to the gantry. Typical head maintenance cycles require 15-60 seconds per visit to the service station. For a 2,000-layer build, removing 1 second per layer of build time is the equivalent of removing 33 minutes from the building operation. At 10 seconds per layer, a 2,000-layer build would last approximately 5 hours and 35 minutes. Servicing the head for 45 seconds every 25 layers would add an hour, corresponding to an 18% increase in total build time. Therefore, for a 10-second layer time, massive gains can be made in hardware performance by eliminating work stoppages for print head maintenance.

Aspects described herein include at least removable, cleanable, replaceable vacuum knife aperture components configured to the service station. The vacuum knife aperture components may allow a balancing of suction across a print head array and may enable offline cleaning (including aggressive offline cleaning) of the vacuum knife aperture components. Aspects of the spittoon assembly described herein may include aerosol coalescing geometry that may receive and contain (e.g., control) droplets ejected from (spit from) the print head during service, integral washing fluid aerosol ports in a service station that may spray print head faces as well as wash internal structures of the service station to reduce a buildup of binder residue and particulate accumulation on components (where the buildup reduces reliance on operator cleaning).

At least one benefit obtained in connection with the examples described herein includes not stopping motion in the process (x-axis) direction (or even not slowing down the gantry) on a single-pass binder jet printer for the duration of the build. Another benefit may include not stopping motion in the cross-process (y-axis) direction to service the heads on the gantry. Another benefit may include carrying the service station on the gantry for scanning-style printing. As used herein, a scanning-style printing is different from single pass printing. In single pass printing, an array of print heads may move over a powder bed and deposit (also referred to as jets) a full width image continuously in the x direction. According to scanning style printing, a print head (or array of print heads) may increment along the x-axis and print a swath by traversing in the y-axis direction. This repeats until the full image is printed. Scanning style may be a slower process but is scalable for large images more easily and cost effectively compared to single pass printing. In a scanning-style printing system, the service station may be attached to the gantry. The gantry itself moves in the x-axis direction but may have an actuator mounted on the gantry that moves the scanning print head in the y-axis direction. If a service station were placed past an end of print travel in the y-axis direction on the gantry, the scanning print head could continue past the end of printing to be cleaned after every swath or periodically during an image. The alternative to the scanning-style printing may be the single pass printing, in which an entire image layer may be printed before the print head(s) were services (e.g., cleaned). Another benefit may include providing a non-contact service station with enough area and flow of flushing fluid to clean the face of the print heads in a single pass over the service station. Another benefit may be a weir design that provides flow across the face of the head without danger of contact with the face. Another benefit may be a liquid distribution system that eliminates pump pulsations and balances a flow of wash liquid evenly across the weirs over a range of flow rates without manual adjustment. Another benefit may include a vacuum knife and plenum and control system that balances suction and airflow across a plurality of print heads (e.g., eight print heads). The preceding list of benefits is for exemplary purposes and is not intended to be limiting.

FIG. 1 is a block diagram representative of a three-dimensional (3D) printer 100, including a service station 102, according to some aspects of the disclosure. In some examples, the 3D printer 100 may be a binder jet 3D printer. Other types of 3D printers, such as, but not limited to, other types that use an array of nozzles, are within the scope of this disclosure. The scale and shape of the blocks, as well as the relative differences in scale and distance between the blocks, are not meant to be accurate or representative of the actual hardware represented by any given block. The 3D printer 100 includes a print head assembly 104.

Figure 2:
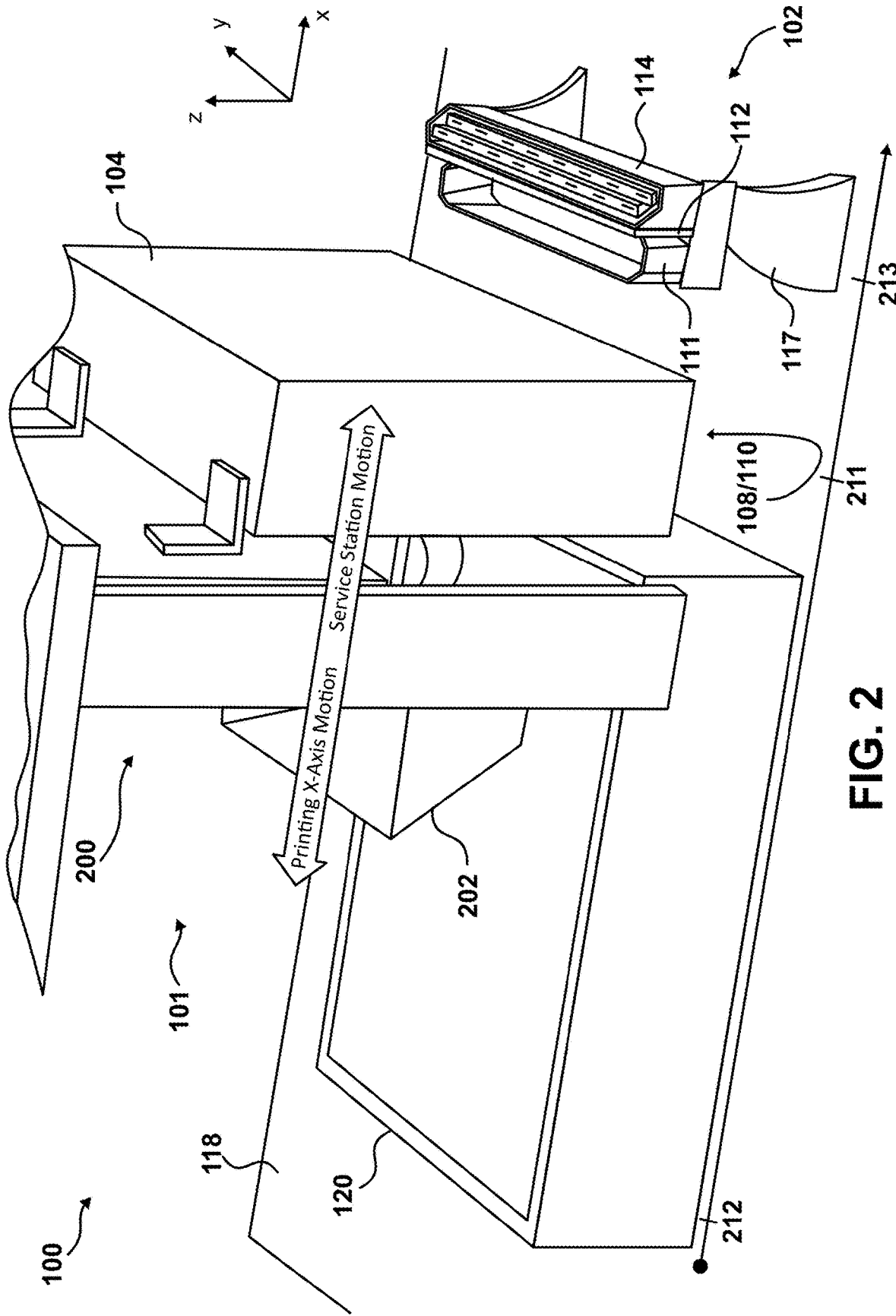
FIG. 2 is a drawing illustrating a perspective view of the hardware depicted in block diagram form in FIG. 1, according to some aspects of the disclosure.

The print head assembly 104 may include control electronics 106. The control electronics 106 may include one or more processors 116, one or more memories 126 coupled to the one or more processors 116, and computer-readable medium 136 coupled to the one or more processors 116 and one or more memories 126 by a bus (not shown). The print head assembly 104 may also include a print head 108. The print head 108 may be coupled to a nozzle plate 110. The print head may be coupled to the control electronics 106 and may receive commands from the one or more processors 116 based on instructions stored in the one or more memories 126 and/or the one or more computer-readable medium 136. The instructions may cause the one or more processors 116 to execute the commands and/or transmit the commands to, for example the print head 108 and a gantry 101. Part of the gantry 101 is depicted in FIG. 1 and a greater part of it is depicted in FIG. 2. The gantry 101 may be coupled to the print head assembly 104.

The service station 102 may include a spittoon assembly 111, a vacuum knife assembly 112, and a non-contact wash assembly 114, according to some aspects of the disclosure. The spittoon assembly 111, the vacuum knife assembly 112, and the non-contact wash assembly 114 may be referred to as a spittoon station, the vacuum knife station, and the non-contact wash station herein.

Top surfaces (e.g., top edges) of the spittoon assembly 111, the vacuum knife assembly 112, and the non-contact wash assembly 114 may be spaced apart from an opposing bottom surface of the nozzle plate 110 when the nozzle plate 110 traverses (i.e., translates along, moves along) the x-axis. According to some aspects, the distance 122 separating a top surface of a highest part (corresponding to a greatest z-axis value associated with the part) of at least one of: the spittoon assembly 111, the vacuum knife assembly 112, or the non-contact wash assembly 114 from an opposing bottom surface of the nozzle plate 110 may be fixed; however, nothing herein precludes the distance 122 from being manually adjusted or dynamically adjusted.

The spittoon assembly 111, the vacuum knife assembly 112, and the non-contact wash assembly 114 may be coupled to a service station support member 117. The service station support member 117 may be coupled to a base 118 (e.g., a support structure, a table, a stand, or a platform). According to some aspects, the service station support member 117 may be fixed to the base 118 or, more generally, the service station support member 117 may remain stationary relative to the base 118. However, it is within the scope of this disclosure for the service station support member 117, or any one or combination of the spittoon assembly 111, the vacuum knife assembly 112, and the non-contact wash assembly 114 to be fixed to the gantry 101 or the print head assembly 104. However, in the examples of FIGS. 1 and 2, the print head 108 and its attendant nozzle plate 110 may be configured to translate along the x-axis, while the print head 108 and its attendant nozzle plate 110 are above the spittoon assembly 111, the vacuum knife assembly 112, and the non-contact wash assembly 114.

The spittoon assembly 111 may be configured as a print head 108 waste liquid receptacle. The waste liquid may include, but is not limited to, binder fluid and/or ink fluid. The spittoon assembly 111 may be so named because the spittoon assembly 111 receives aerosol "spits" of the waste liquid expelled from the print head 108 via the nozzle plate 110. The vacuum knife assembly 112 may be configured to remove (e.g., by pulling with vacuum pressure, pressure that is lower than atmospheric pressure, a negative pressure) debris and/or droplets of binder fluid and/or ink from the nozzle plate 110 surface. The non-contact wash assembly 114 may execute a washing process that may apply a washing solution to the nozzle plate 110 to wash away or loosen the debris and/or droplets of binder fluid and/or ink on the nozzle plate 110. The service station 102 may also be configured as a capping station (not shown, described below). According to some aspects, the 3D printer 100 may take less than about five seconds per service interval.

Generally included with the 3D printer 100 is a build bed 120. The build bed 120 may also be referred to as a build box. The build bed 120 includes a platen (e.g., a flat plate on which the 3D part is printed) that may be raised and lowered relative to the base 118. The gantry 101 may be configured to translate the print head assembly 104, including at least the print head 108 and the nozzle plate 110, along the x-axis over the service station 102 and the build bed 120. After each layer of a 3D part is printed in the build bed 120, the platen lowers, providing room for the next layer atop the just-printed layer.

As used herein, a translation along the x-axis toward and over the build bed 120 (and over the platen) may be referred to as a printing x-axis motion herein. In the coordinate system used in the figures appended hereto, the printing x-axis motion is in the negative x-axis direction. The translation along the x-axis toward and over the service station 102 may be referred to as a service station motion herein. In the coordinate system used in the figures appended hereto, the service station motion is in the positive x-axis direction. The x-axis may also be referred to herein as a process axis, while the Y-axis (not shown in FIG. 1, directed into the plane of the drawing) may be referred to as a cross-process axis.

In summary, an apparatus configured as a three-dimensional (3D) printer 100 may include a print head assembly 104 comprising a print head 108 and a nozzle plate 110, the nozzle plate 110 configured to dispense droplets of liquid provided from the print head 108. The apparatus may also include a build bed 120 configured to receive at least some of the droplets from the nozzle plate 110, and a service station 102. The service station may include a spittoon assembly 111 configured to receive at least some of the droplets from the nozzle plate 110, a vacuum knife assembly 112 configured to remove at least one of: debris, or at least some of the droplets from a surface of the nozzle plate 110, and a non-contact wash assembly 114 comprising a plurality of weirs configured to upwell a washing fluid and immersively receive the nozzle plate 110 in the washing fluid.

According to some aspects, the build bed 120 is spaced apart from the service station 102 along an x-axis passing perpendicularly through the build bed 120 and the service station 102. The apparatus configured as the three-dimensional (3D) printer 100 may also include a gantry 101 coupled to the print head assembly 104 and configured to traverse the print head assembly 104 in a first direction along the x-axis from a first location 211 on the x-axis to a second location 212 on the x-axis, the second location 212 different from the first location 211 and the second location 212 over the build bed 120, and to traverse the print head assembly 104 in a second direction, opposite to the first direction, along the x-axis to a third location 213 on the x-axis, distal from the second location 212 and over at least one of: the spittoon assembly 111, the vacuum knife assembly 112, or the non-contact wash assembly 114 of the service station 102, where the third location 213 is equal to the first location 211 (i.e., the first location 211 illustrated in FIG. 2 would lie on the same location as the third location 213) or the first location 211 is between the build bed 120 and the service station 102.

FIG. 2 is a drawing illustrating a perspective view of the hardware depicted in block diagram form in FIG. 1 according to some aspects of the disclosure. The scale and shape of the hardware, as well as the relative differences in scale and distance between the hardware, are not meant to be accurate or representative of the actual hardware. All figures herein are presented for discussion and not limitation. FIG. 2 includes the 3D printer 100 and the service station 102 of FIG. 1 according to some aspects of the disclosure. FIG. 2 provides a better illustration of the relative motion between the various components of the 3D printer 100 and the service station 102.

The 3D printer 100 includes a printer assembly 200, which includes the print head assembly 104 and the printer supply reservoir 202. The printer supply reservoir 202 may be coupled to the print head assembly 104. The printer assembly 200 may be coupled to the gantry 101.

The print head assembly 104 includes the print head 108 and its attendant nozzle plate 110 (not shown in FIG. 2 but indicated by the upward curving arrow 108/110 as being located beneath, or extending from, a bottom of the print head assembly 104). The print head assembly 104 may be coupled to the gantry 101. A printer supply reservoir 202 may also be coupled to the gantry 101 and the print head assembly 104.

The service station 102 may include the spittoon assembly 111, the vacuum knife assembly 112, and the non-contact wash assembly 114. The spittoon assembly 111, the vacuum knife assembly 112, and the non-contact wash assembly 114 may be fixed to the service station support member 117. The service station support member 117 may be coupled to the base 118.

All components in FIG. 2 that have the same name and reference number as those in FIG. 1 have been described fully in connection with FIG. 1. Their descriptions will not be repeated for the sake of brevity.

A person having ordinary skill in the art will recognize that additional components, such as, but not limited to, power transformers, motors, steppers, gears, electronics, tubing, and wiring, are utilized to interconnect and operate the components of the 3D printer 100 and the service station 102. All such components have been omitted to avoid cluttering the drawing.

As depicted in FIG. 2, the gantry 101, coupled to the print head assembly 104 and the printer supply reservoir 202, may translate in both directions along the x-axis (i.e., in the printing x-axis motion direction and in the opposite service station motion direction). By traveling back and forth over the build bed 120, the print head 108 is configured to provide ink liquid and binder liquid in droplet form into the build bed 120, to build a given 3D part layer-by-layer, slice-by-slice.

The service station 102 may be configured to service the print head 108 and its attendant nozzle plate 110 while the print head assembly 104 is in a sequence of motion during a 3D printing process (e.g., service on the fly). The sequence of motion includes travel of the print head 108 and its attendant nozzle plate 110 from a parked, neutral, or intermediate location along the x-axis (e.g., between the build bed 120 and the service station 102 in one example) and from there across the build bed 120 (e.g., in the direction labeled printing x-axis motion). Upon reaching the far side of the build bed 120, the gantry 101 transporting the print head 108 and its attendant nozzle plate 110 within the print head assembly 104 returns in the opposite direction (e.g., in the direction labeled service station motion). The print head 108 and its attendant nozzle plate 110 may return to the parked, neutral, or intermediate location before repeating the process.

However, according to aspects of the disclosure, the print head 108 and its attendant nozzle plate 110 may return to the service station 102. In some examples, the service station 102, or any of its components or assemblies (e.g., the spittoon assembly 111, the vacuum knife assembly 112, and the non-contact wash assembly 114) may not be located at the parked, neutral, or intermediate location. In other examples, at least one of: the spittoon assembly 111, the vacuum knife assembly 112, or the non-contact wash assembly 114 may be located at the parked, neutral, or intermediate location.

Figure 3:
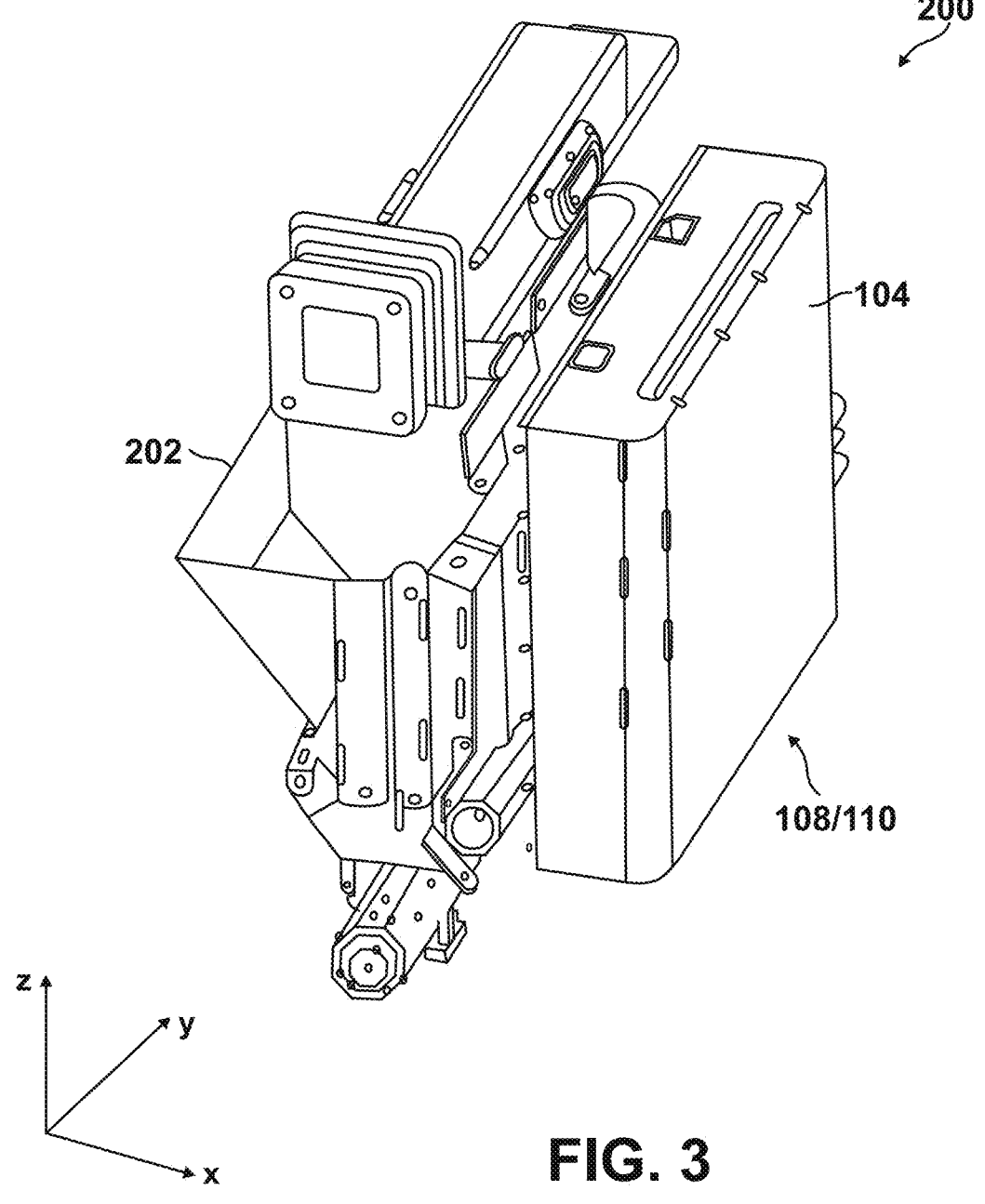
FIG. 3 is a drawing of an upper rear perspective view of the printer assembly of FIG. 2, according to some aspects of the disclosure.

FIG. 3 is a drawing of an upper rear perspective view of the printer assembly 200, according to some aspects of the disclosure. The printer assembly 200 includes a printer supply reservoir 202 as shown and described in connection with FIG. 2. Similar to that as shown and described in connection with FIGS. 1 and 2, the printer assembly 200 includes a print head assembly 104 including the print head 108 and the nozzle plate 110, all as shown and described in connection with FIGS. 1 and 2. Descriptions of these components will not be repeated for the sake of brevity.

FIG. 3 also shows additional components, such as, but not limited to, power transformers, motors, steppers, gears, electronics, tubing, and wiring, which were omitted from FIG. 2 to avoid cluttering that drawing. The identity, placement, purpose, and use of these other components will be understood by persons having ordinary skill in the art and are not presented herein for the sake of brevity.

Figure 4:
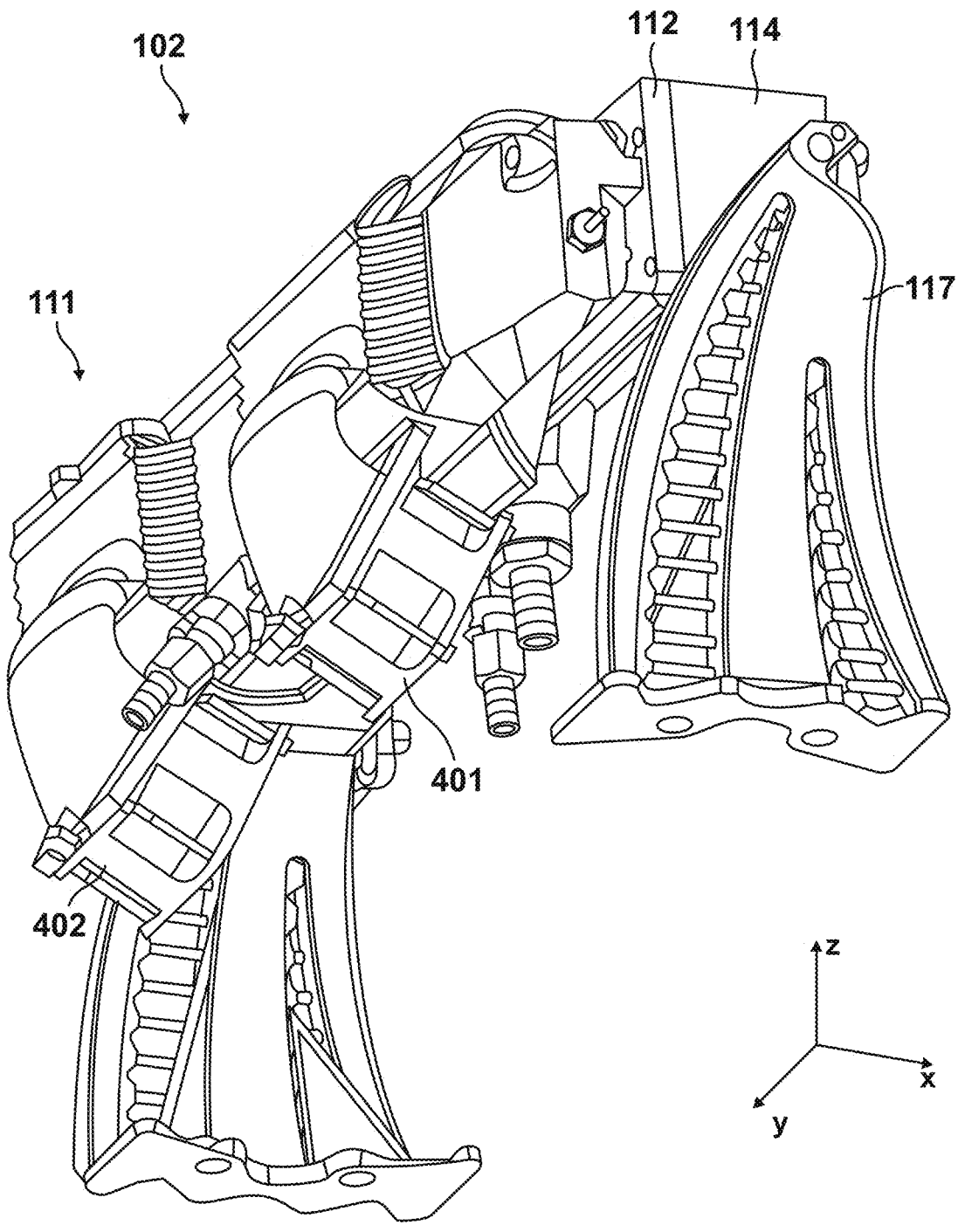
FIG. 4 is a drawing of a lower front perspective view of the service station of FIG. 1 and FIG. 2, according to some aspects of the disclosure.

FIG. 4 is a drawing of a lower front perspective view of the service station 102 of FIG. 1 and FIG. 2, according to some aspects of the disclosure. Visible in the lower front perspective view are a spittoon assembly 111, a vacuum knife assembly 112, and a non-contact wash assembly 114, all coupled to a service station support member 117, all the same as or similar to the similarly named components as shown and described in connection with FIG. 1 and FIG. 2. Accordingly, for the sake of brevity, descriptions of these components will not be repeated.

FIG. 4 also depicts a first fan assembly 401 and a second fan assembly 402. The spittoon assembly 111 features a down draft powered by (e.g., present as a result of the operation of, supplied by) the first fan assembly 401 and the second fan assembly 402. The down draft (not shown) may be configured to pull downward droplets that may be ejected from a face (i.e., a bottom surface) of the nozzle plate (110, FIG. 1) of the print head (108, FIG. 1) (e.g., during a spitting process). The droplets may be, for example, droplets of binder fluid and/or ink fluid. Pulling the droplets downward aids (or causes) the ejection of the droplets from the face of the nozzle plate (110, FIG. 1), and may prevent a buildup of residue (e.g., formed by dried binder and/or ink droplets) left on the nozzle plate (110, FIG. 1) (not shown in FIG. 4) after a "spitting" process associated with the spittoon assembly 111 as shown and described herein. The spitting process may help to ensure that nozzles of the nozzle plate 110 are primed with ink/binder and any washing fluid that has been ingested into the nozzles is purged and/or ejected.

Additionally or alternatively, a vacuum knife of the vacuum knife assembly 112 may also remove attached droplets from the face of the nozzle plate (110, FIG. 1). A process of traversing or driving the print head (108, FIG. 1) with its attendant nozzle plate (110, FIG. 1) over the vacuum knife assembly 112 (while the vacuum knife is operating) may be performed before or after a spitting process. Likewise, a process of traversing or driving the print head (108, FIG. 1) with its attendant nozzle plate (110, FIG. 1) over the vacuum knife assembly 112 (while the vacuum knife is operating) may be performed before or after a washing process.

Figure 5:
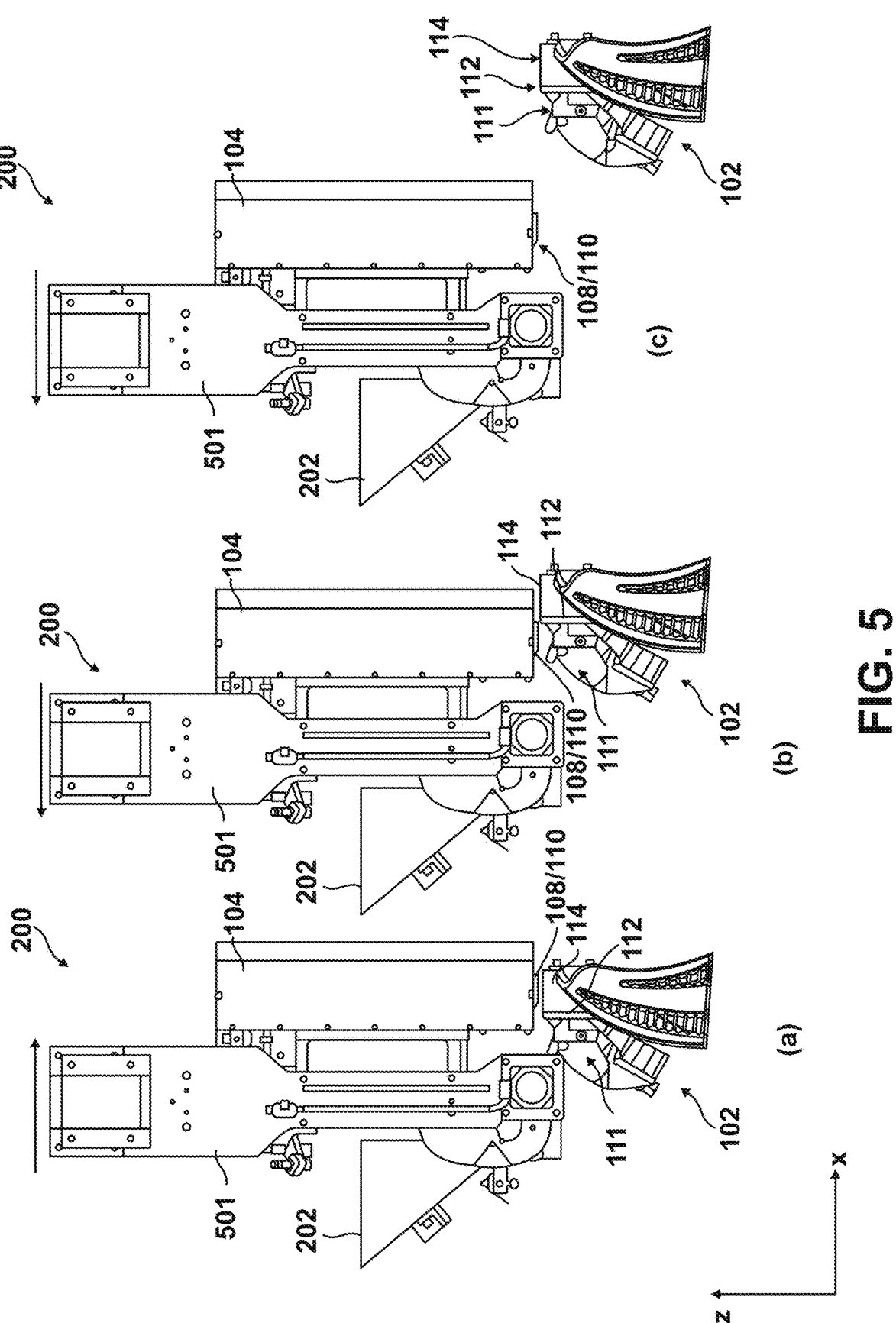
FIG. 5 is a sequence of illustrations depicting three stages (a, b, c) of gantry motion or placement relative to the service station, according to some aspects of the disclosure.

FIG. 5 is a sequence of illustrations depicting three stages (a, b, c) of gantry 501 motion or placement relative to the service station 102 according to some aspects of the disclosure. The service station 102 may be the same as the service station 102, as shown and described in connection with FIGS. 1, 2, and 4. The gantry 501 may be the same as or similar to the gantry 101 as shown and described in connection with FIGS. 1 and 2. The order of the three stages is not necessarily indicative of the order of actual operations described in connection with FIG. 5. The printer assembly 200 as shown and described in connection with FIG. 2 and FIG. 3. The print head assembly 104 is as illustrated and described in connection with FIGS. 1 and 2. The print head assembly 104 includes the print head/nozzle plate 108/110, as shown and described in connection with FIGS. 1 and 2.

At stage (a), the gantry 501 moves the print head/nozzle plate 108/110 over the non-contact wash assembly 114, which upwells (e.g., gently, and upwardly flows) a washing fluid (602, FIG. 6) (e.g., cleaning solution) across the nozzle plate (not visible). Once the nozzle plate has been rinsed, at stage (b) the gantry 501 moves the print head/nozzle plate 108/110 across a vacuum knife assembly 112 and then pauses over the spittoon assembly 111. The vacuum knife assembly 112 includes a vacuum knife (not shown) configured to remove droplets and debris that may remain on the print head/nozzle plate 108/110. At stage (c), the gantry 501 moves the print head/nozzle plate 108/110 along a direction of the printing axis of motion (i.e., in a negative x-axis direction) toward and across the build box (not shown) (120, FIGS. 1 and 2).

According to some aspects, routine printing exercises most of the jets of a print head 108 (i.e., most of the nozzles of a nozzle plate 110) most of the time, but a short burst of 500 droplets (other numbers of droplets are within the scope of the disclosure) may be fired into the spittoon assembly 111 every 1-10 layers of the 3D printing process, while the gantry 101, 501 is in motion or while it is changing direction, to keep the nozzles of the nozzle plate 110 from drying out, for example. According to some aspects, during a printing process, a cleaning sequence may be triggered, for example, by one or more of: a number of layers printed, a number of pixels printed, and an optical detection of head fouling. Other ways and parameters that trigger the cleaning sequence are within the scope of the disclosure.

Figure 6:
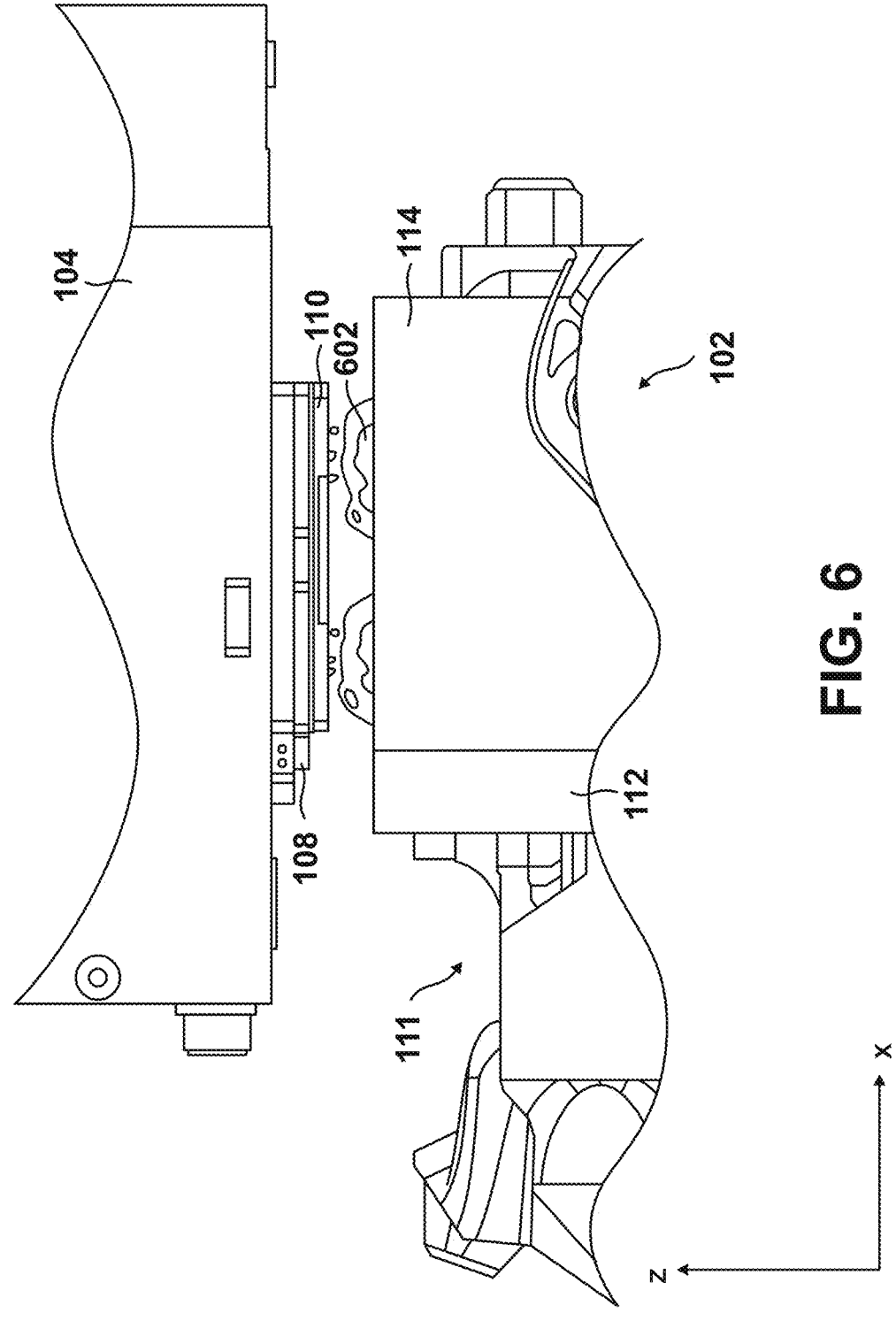
FIG. 6 illustrates the print head and nozzle plate in the print head assembly paused over the non-contact wash assembly, according to some aspects of the disclosure.

FIG. 6 illustrates the print head 108 and nozzle plate 110 in the print head assembly 104 paused over the non-contact wash assembly 114, according to some aspects of the disclosure. The upwelling of a washing fluid 602 across the nozzle plate 110 is depicted. The vacuum knife assembly 112 and the spittoon assembly 111 are illustrated to the left of the non-contact wash assembly 114.

Figure 7:
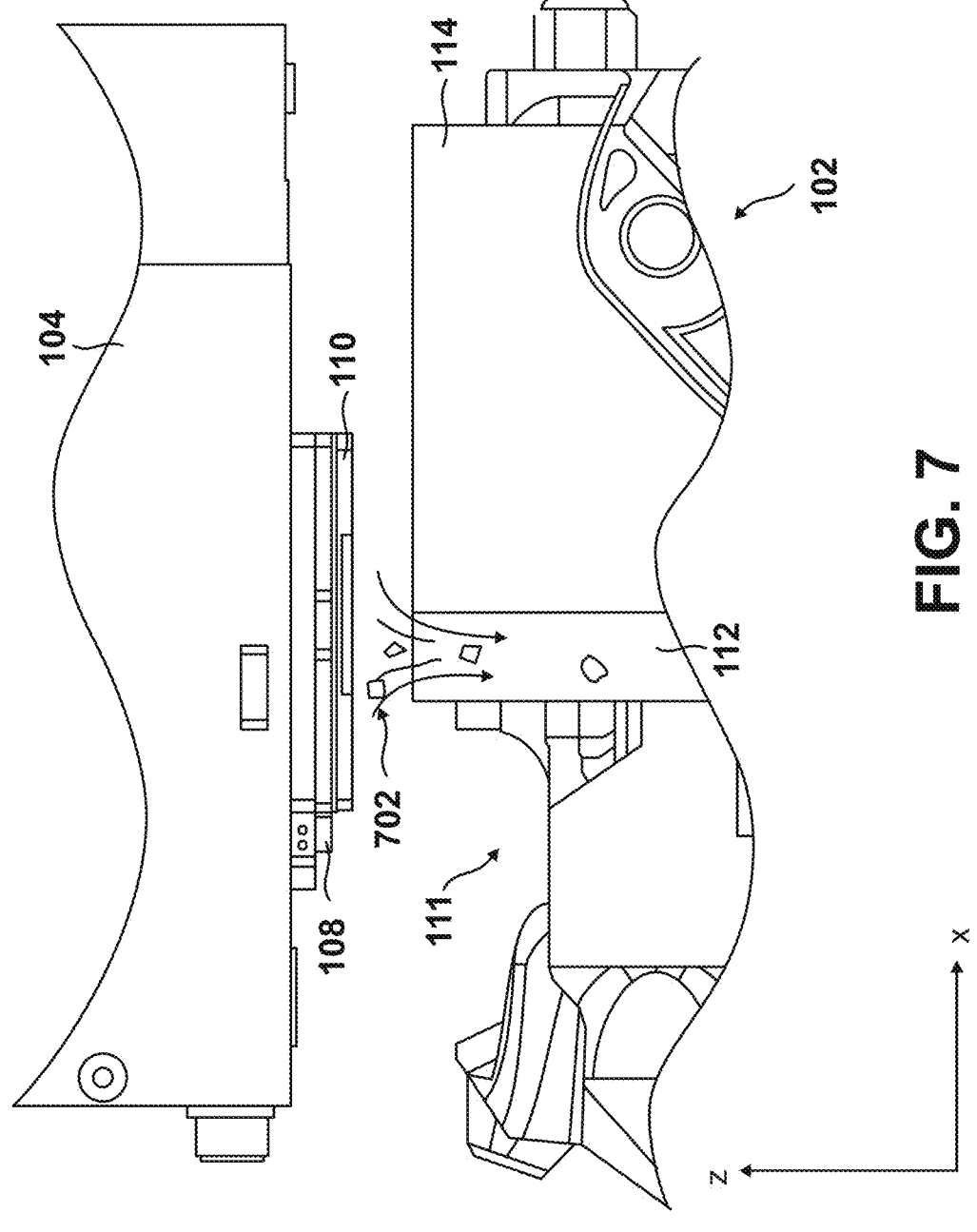
FIG. 7 illustrates the print head and nozzle plate in the print head assembly traversing over the vacuum knife assembly, according to some aspects of the disclosure.

FIG. 7 illustrates the print head 108 and nozzle plate 110 in the print head assembly 104 traversing over the vacuum knife assembly 112, according to some aspects of the disclosure. Debris 702 (e.g., particles, binder liquid, ink liquid) is depicted as being vacuumed into the vacuum knife assembly 112. The spittoon assembly 111 is to the left of the vacuum knife assembly 112, while the non-contact wash assembly 114 is to the right of the vacuum knife assembly 112.

Figure 8:
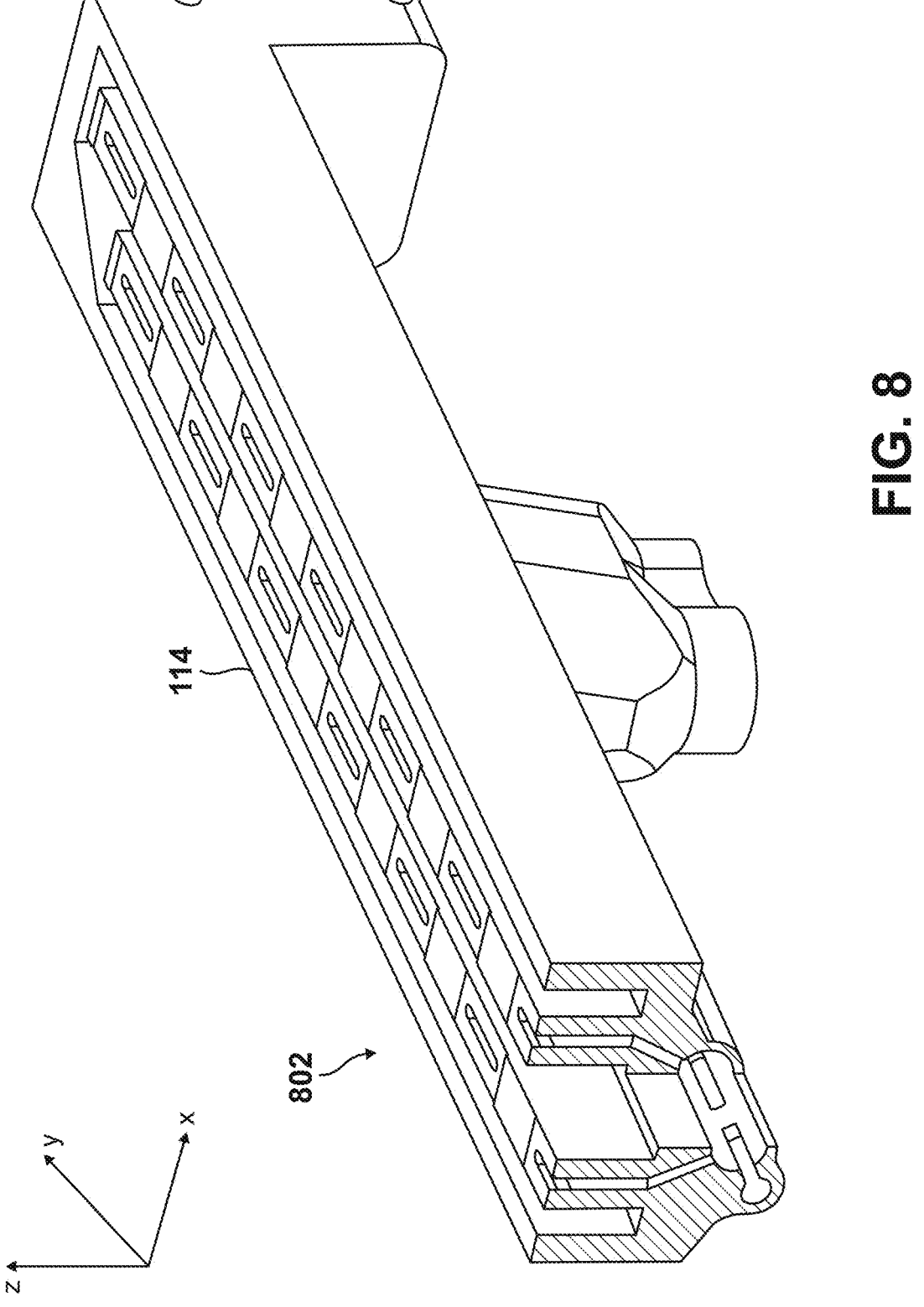
FIG. 8 illustrates a cross-sectional perspective view of the non-contact wash assembly, according to some aspects of the disclosure.

FIG. 8 illustrates a cross-sectional perspective view of the non-contact wash assembly 114, according to some aspects of the disclosure. The non-contact wash assembly 114 includes a series of weirs 802 that gently flow a washing fluid over the face of the nozzle plate 110, rinsing off partially dried binder and/or ink and/or particles of powder.

The print head 108 and its attendant nozzle plate 110 may be moved across the spittoon assembly 111, the vacuum knife assembly 112 and the non-contact wash assembly 114 at relatively high speed or stopped over one assembly for prolonged cleaning cycles.

Figure 9:
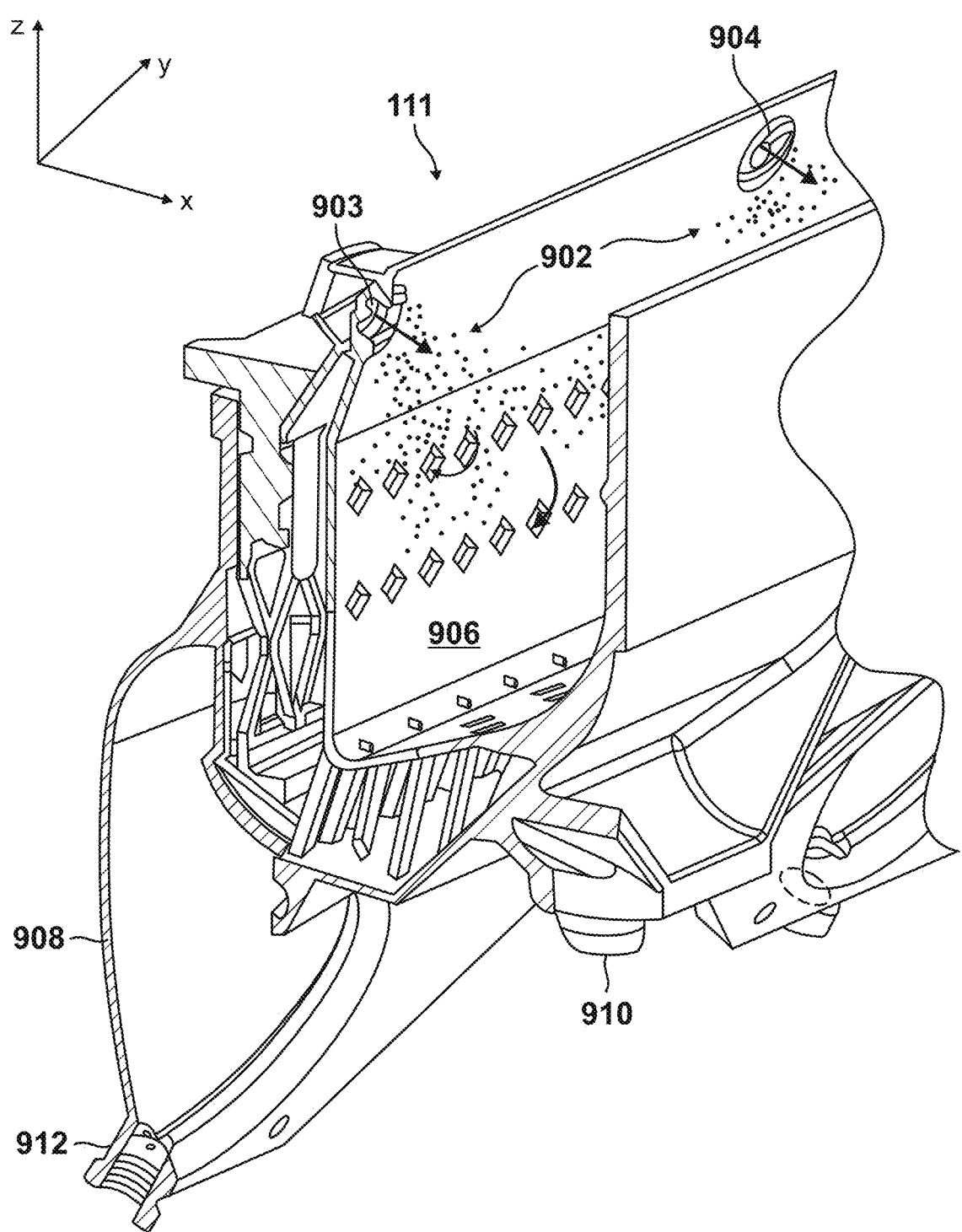
FIG. 9 is a cutaway view of the spittoon assembly, according to some aspects of the disclosure.

FIG. 9 is a cutaway view of the spittoon assembly 111, according to some aspects of the disclosure. The spittoon assembly 111 could be augmented to self-clean by periodically spraying a coarse mist 902 of cleaning fluid through nozzles 903, 904. The nozzles 903, 904 could be printed into an additive design or be separate parts that are assembled to the body of the spittoon assembly 111. It is noted that even if the nozzles 903, 904 and the body are integral to one another, that is one part, that one part will still be referred to herein as a spittoon assembly 111.

According to some aspects, filter/filter elements 906 (e.g., in a single layer or in stacks) may be incorporated into the spittoon assembly 111. In one example, incorporation of a filter stack of 1.5 and 0.22 μm filters in a washing fluid recirculation loop (included in series with the spittoon assembly 111 but not shown) may help to control particulate and biological accumulation in the system.

Misting as opposed to spraying allows the cleaning fluid to collect on the filter/filter elements 906, dissolving any solidified binder and (with sufficient time and volume) coalescing into large enough drops to drip into the drain pan 908. Adding a secondary drain 910 before the fans or other vacuum elements may prevent the diluted binder from causing damage to the negative pressure system (for any liquid that gets past the filter/filter elements 906). Running the diluted binder into the drain pan 908 will help dissolve any binder that did not gravity feed into the drain 912 during a spitting process. Supplementing the misting system with an intermittent spray or flood system may provide a more comprehensive cleaning method, thoroughly flushing dilute binder through the drain pan 908 and into the drain 912.

According to some examples, the spittoon assembly 111, may include an aerosol coalescing geometry configured to receive and control (e.g., collect, or collect and contain) droplets ejected (e.g., spit) from the nozzle plate 110 in association with service provided at the service station 102 (e.g., service of the printhead/nozzle plate 108/110 at and by the service station). The ejection (e.g., the spit) of droplets may occur in response to the use of a spitting process conducted at the service station 102. The spitting process may be conducted while the print head/nozzle 108/110 is above the spittoon assembly 111.

According to some aspects, the aerosol coalescing geometry includes an opening configured to receive droplets ejected from the nozzle plate 110 within a mist (i.e., the mist is within the opening of the spittoon assembly 111. In some examples, the mist may be a mist of cleaning fluid. As used herein, the terms cleaning fluid and washing fluid may be used interchangeably. The droplets may be mixed with the mist, collect at a bottom of the spittoon assembly 111, and may be drained from the bottom of the spittoon assembly 111 via a drain. In some examples, the droplets may be mixed with the mist, passed through a filter, collect at a bottom of the spittoon assembly 111, and may then be drained from the bottom of the spittoon assembly 111 via a drain.

According to some examples, the apparatus (i.e., the 3D printer) may also include an aerosol delivery device (e.g., 1400 of FIGS. 14, 15, and 16) configured to spray a fan of cleaning fluid/sashing fluid across a surface of the nozzle plate 110 during cleaning at the service station 102. In some examples, the aerosol delivery device may be further configured to wash internal structures of the service station 102 to reduce a buildup of binder residue and particulate accumulation on components and reduce reliance on operator cleaning (i.e., cleaning performed by an operator of the apparatus, an operator of the 3D printer 100).

Figure 10:
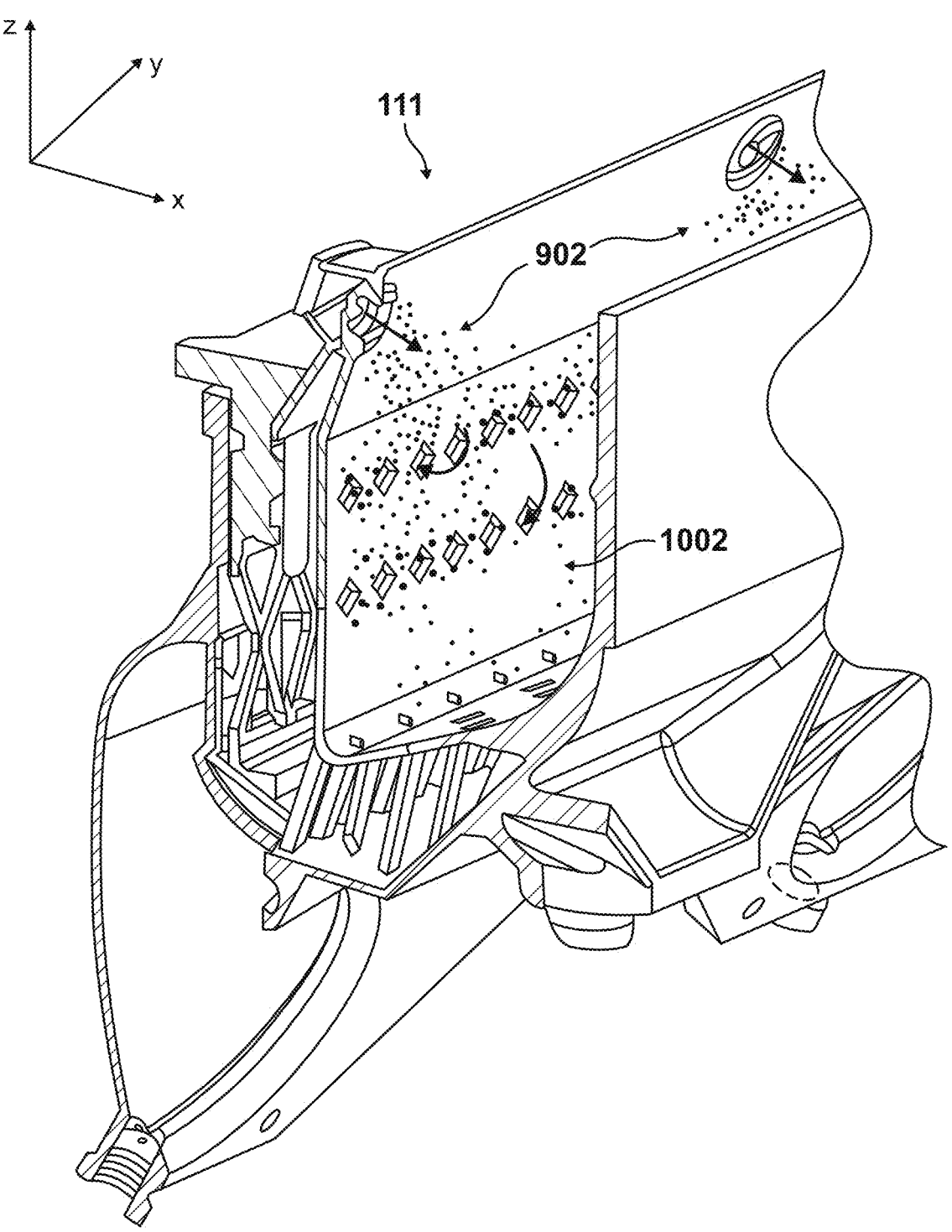
FIG. 10 is a cutaway view of the spittoon assembly of FIG. 9 with additional misting and debris, according to some aspects of the disclosure.

FIG. 10 is a cutaway view of the spittoon assembly 111 of FIG. 9 with additional misting and debris 1002 according to some aspects of the disclosure.

Figure 11:
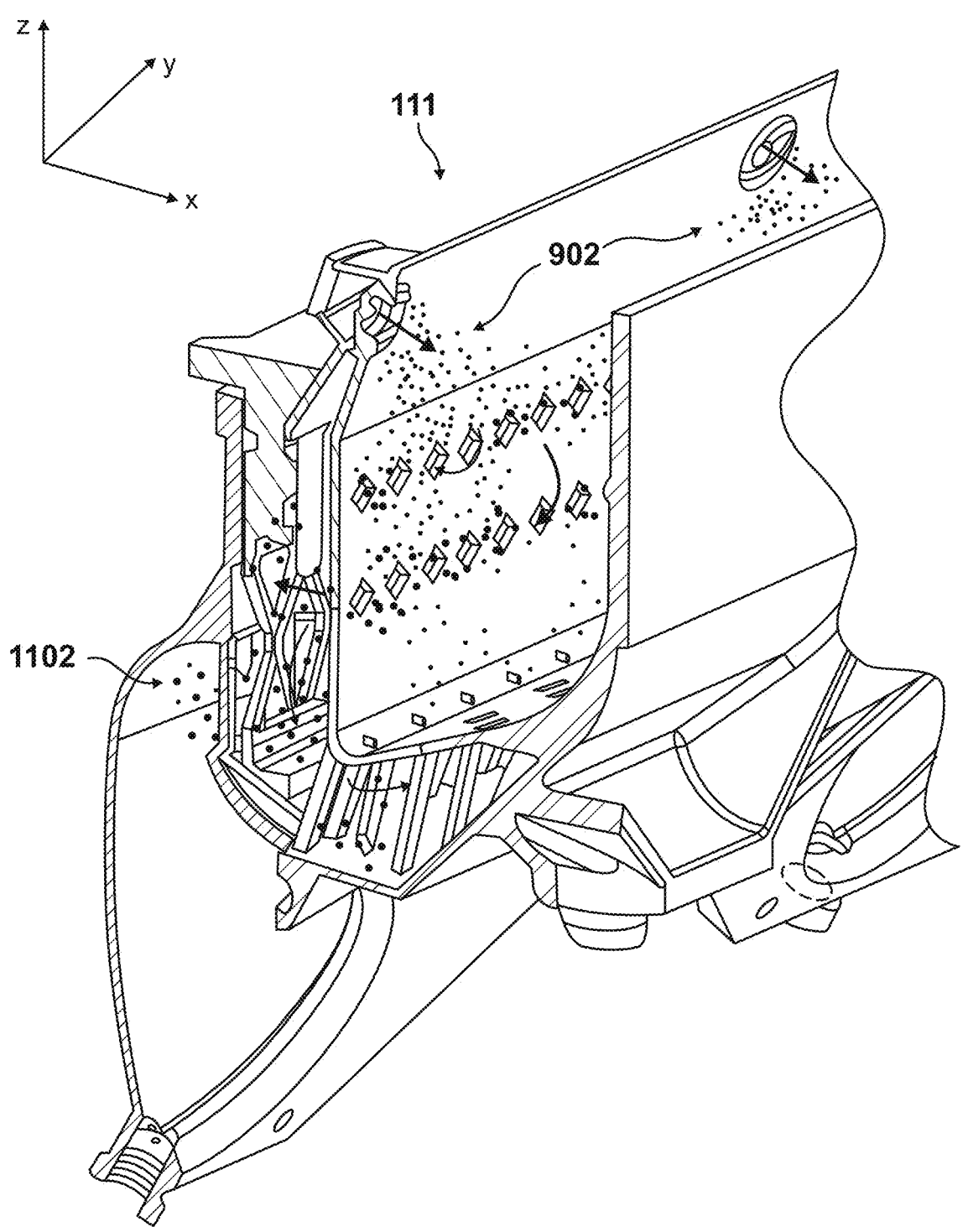
FIG. 11 is a cutaway view of the spittoon assembly of FIG. 10 with still additional misting and debris, according to some aspects of the disclosure.

FIG. 11 is a cutaway view of the spittoon assembly 111 of FIG. 10 with still additional misting and debris 1102 according to some aspects of the disclosure.

Figure 12:
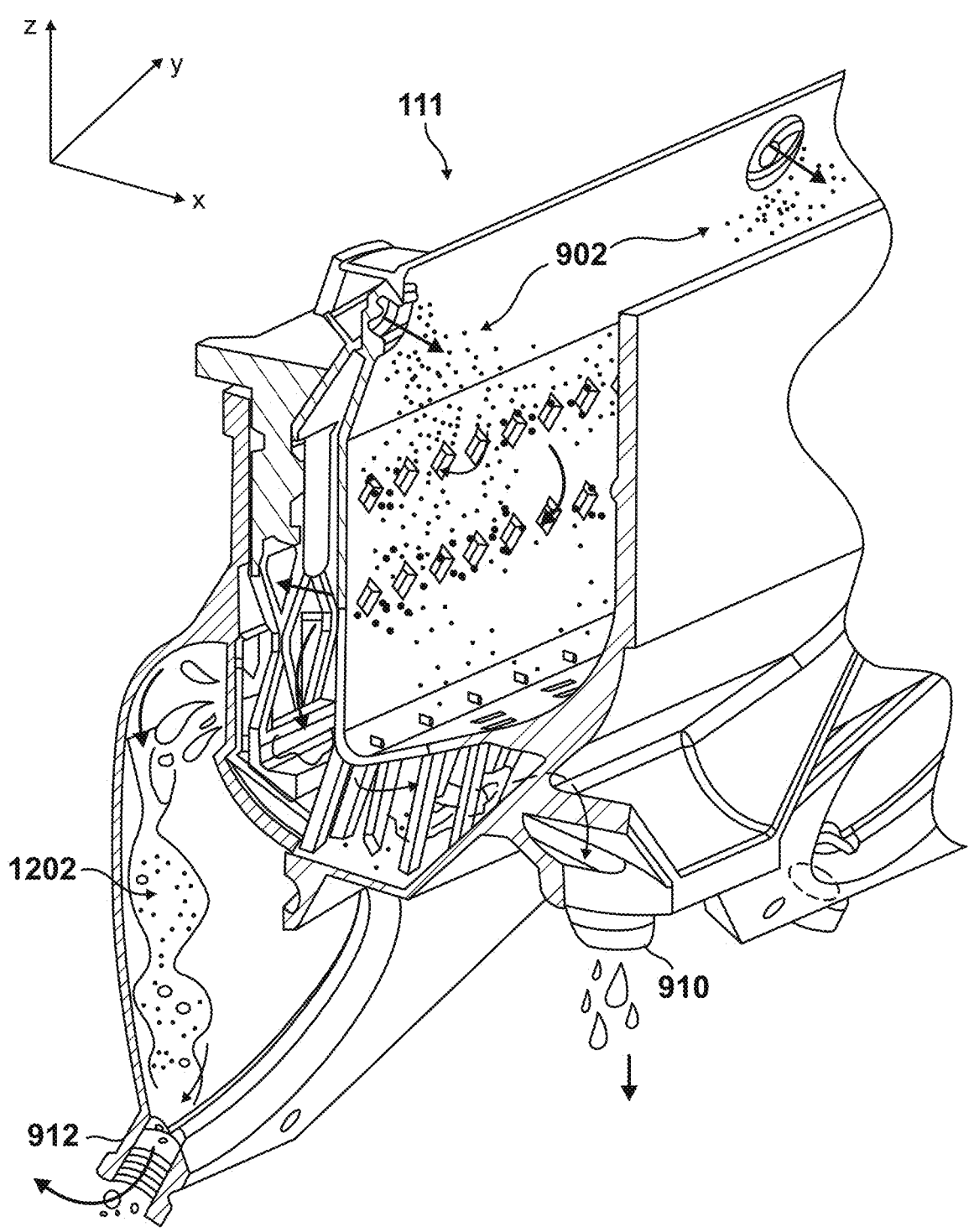
FIG. 12 is a cutaway view of the spittoon assembly of FIG. 11 with still additional misting and debris and drainage emerging from the secondary drain and the drain, according to some aspects of the disclosure.

FIG. 12 is a cutaway view of the spittoon assembly 111 of FIG. 11 with still additional misting and debris 1202 and drainage emerging from the secondary drain 910 and the drain 912 according to some aspects of the disclosure.

Figure 13:
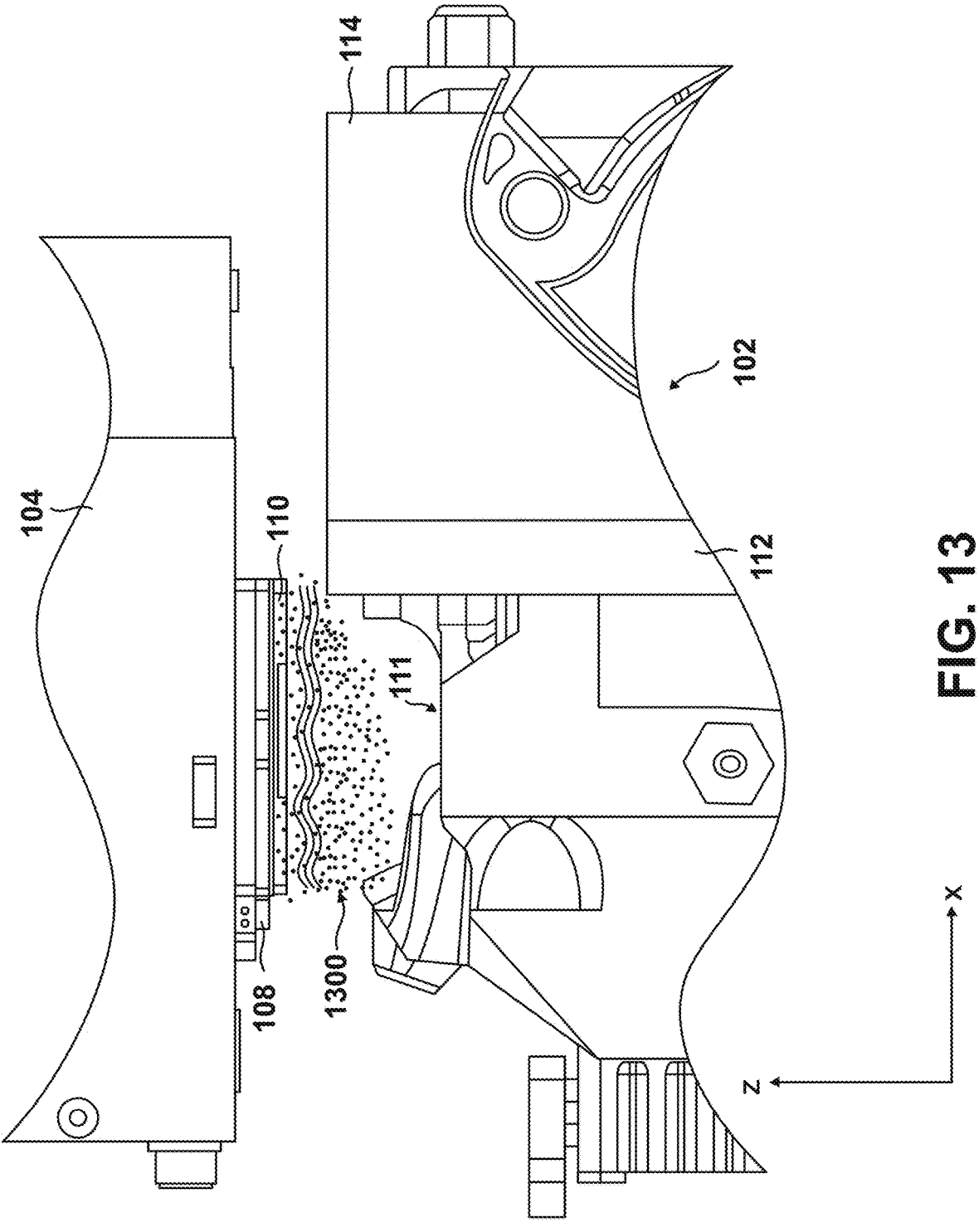
FIG. 13 illustrates the spittoon assembly emitting a mist, according to some aspects of the disclosure.

FIG. 13 illustrates the spittoon assembly 111 emitting a mist 1300 according to some aspects of the disclosure. Periodically emitting the mist 1300 while the negative pressure system is disabled could be used as a pseudo-capping system by providing a humidified region for the print head 108 with its attendant nozzle plate 110 to be parked while idle. Combining this with periodic service station cleaning and spitting may provide long-term cleaning benefits similar to steaming without the heat.

Figure 14:
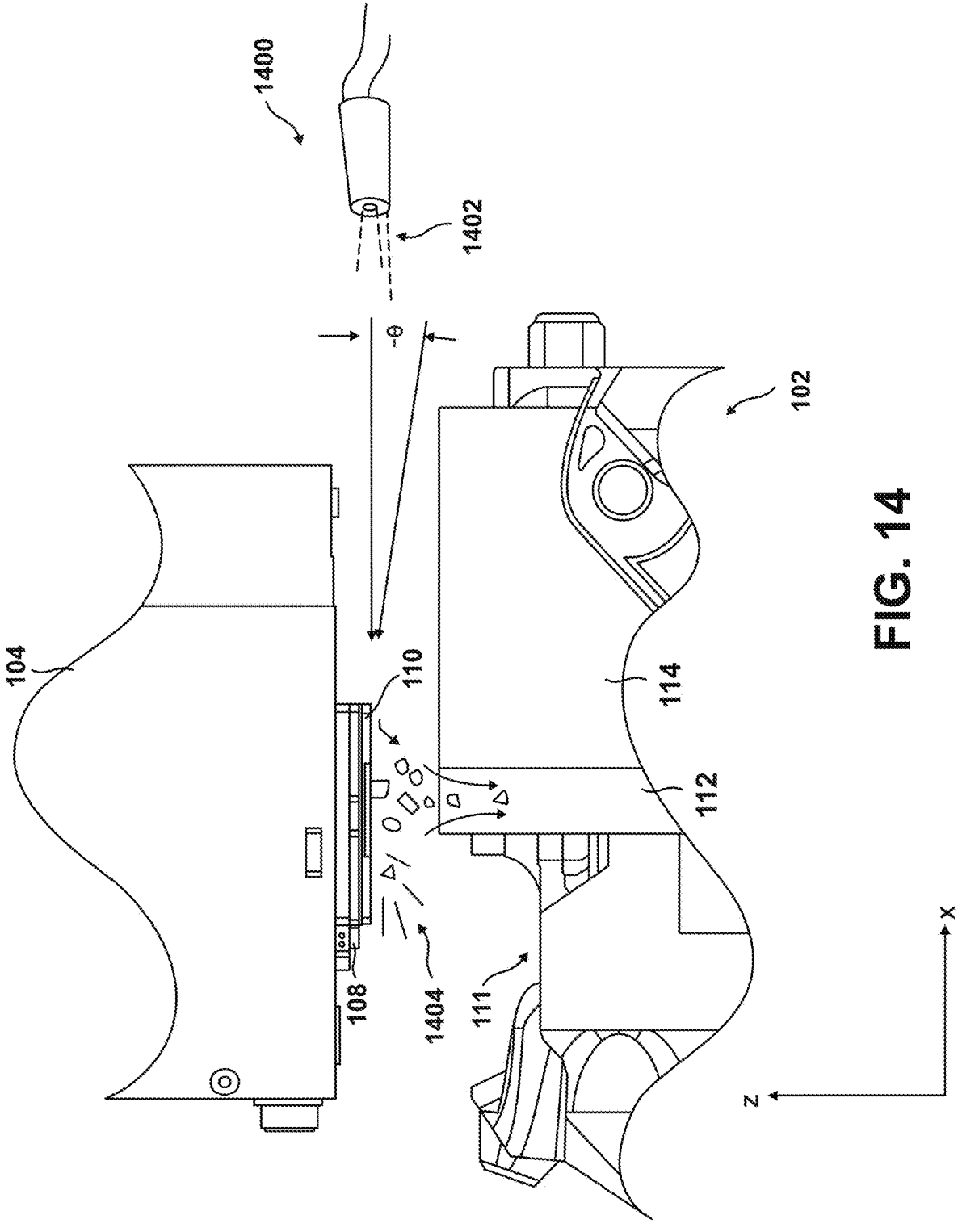
FIG. 14 is an illustration of a portion of a service station and self-cleaning system that includes an aerosol delivery device that sprays a fan of cleaning fluid, according to some aspects of the disclosure.

FIG. 14 is an illustration of a portion of a service station 102 and self-cleaning system that includes an aerosol delivery device 1400 that sprays a fan of cleaning fluid 1402 across a surface of the nozzle plate 110, according to some aspects of the disclosure. The service station 102 can be made self-cleaning by adding (e.g., integrally adding, configured to include) the aerosol delivery device 1400 that sprays a fan of cleaning fluid 1402 perpendicular or at a slight negative angle to the print head 108, which could improve the removal of solids (powder or other oversized contaminants) without inducing a significant pressurization of the jetting face. This would provide a shearing action on any particulates 1404 clinging to the face of the nozzle plate 110 of the print head 108. Using the aerosol delivery device 1400 in conjunction with the vacuum knife assembly 112 could ensure that the contaminants are drawn away from the jetting faces while being sprayed. Using this in conjunction with the weirs (802, FIG. 8) of the non-contact wash assembly 114 would cause the momentum of the spray jet of the aerosol delivery device 1400 to be damped immediately after contact with the face of the print head 108, which could reduce the risk of contaminants scoring the face of the print head 108 while being removed. Placing a vacuum knife assembly 112 adjacent to the weirs (802, FIG. 8) of the non-contact wash assembly 114 may allow both effects to be achieved.

Figure 15:
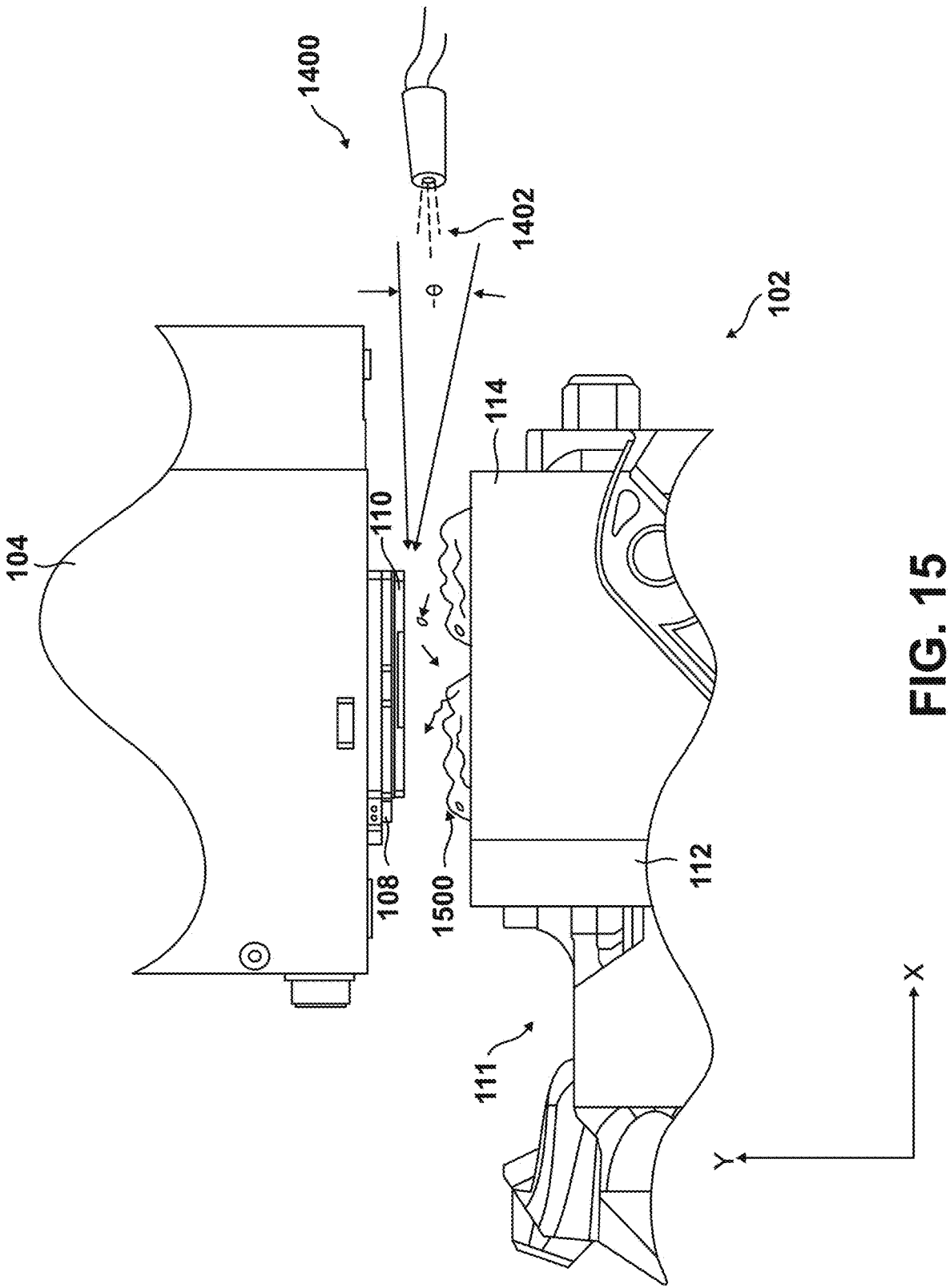
FIG. 15 is an illustration of the portion of the service station and the self-cleaning system that sprays a fan of cleaning fluid of FIG. 14 and the addition of washing fluid upwelling from the weirs of the non-contact wash assembly, according to some aspects of the disclosure.

FIG. 15 is an illustration of the portion of the service station 102 and the aerosol delivery device 1400 that sprays a fan of cleaning fluid 1402 of FIG. 14 and the addition of washing fluid 1500 (e.g., cleaning solution) upwelling from the weirs (802, FIG. 8) of the non-contact wash assembly 114, according to some aspects of the disclosure.

Figure 16:
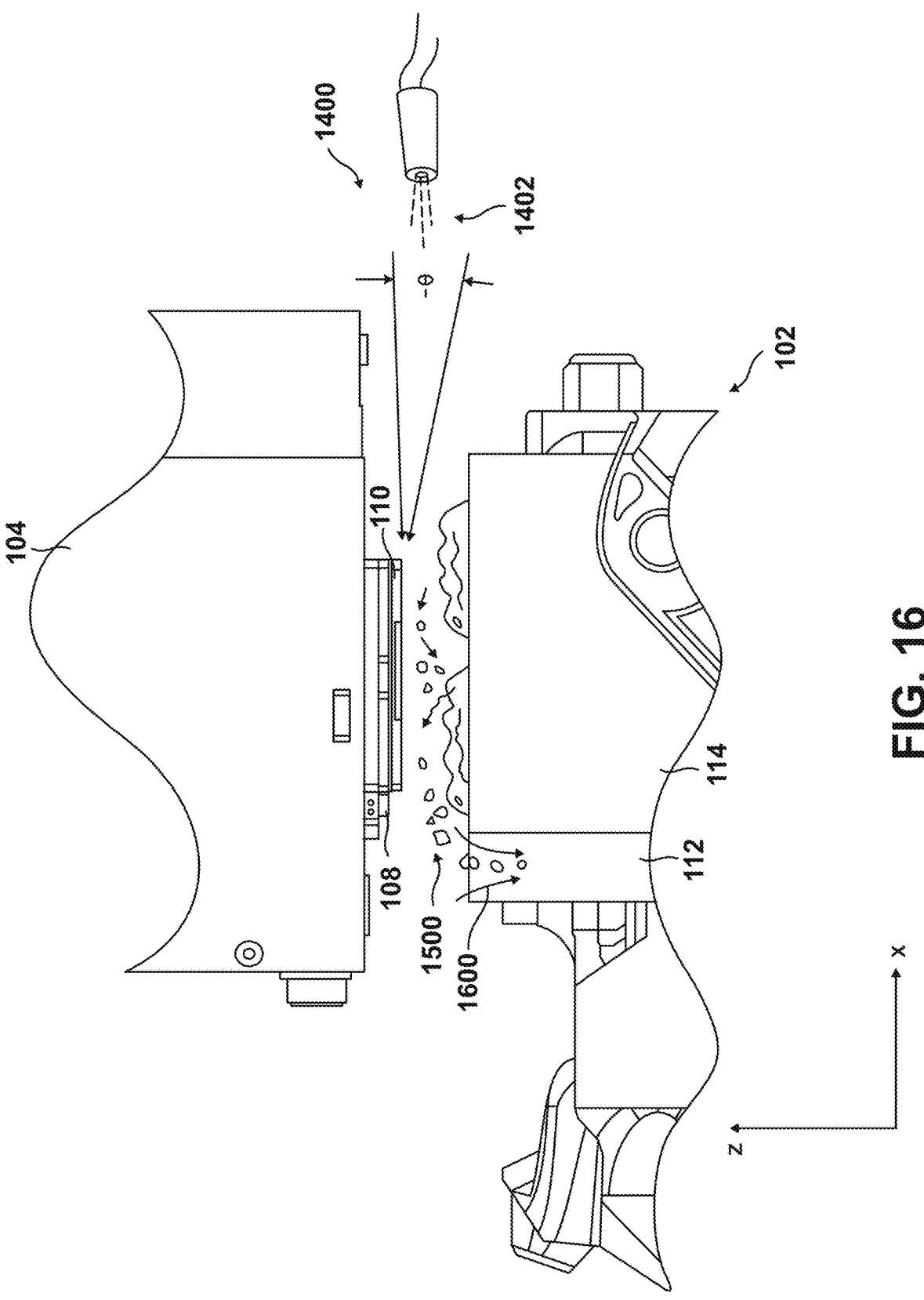
FIG. 16 is an illustration of the portion of the service station and the self-cleaning system that sprays a fan of cleaning fluid of FIG. 14 and the addition of washing fluid upwelling from the weirs of the non-contact wash assembly, as well as illustrating the vacuuming action of the vacuum knife assembly, according to some aspects of the disclosure.

FIG. 16 is an illustration of the portion of the service station 102 and the aerosol delivery device 1400 that sprays a fan of cleaning fluid 1402 of FIG. 14 and the addition of washing fluid 1500 upwelling from the weirs (802, FIG. 8) of the non-contact wash assembly 114, as well as illustrating the vacuuming action 1600 of the vacuum knife assembly 112, according to some aspects of the disclosure.

Figure 17:
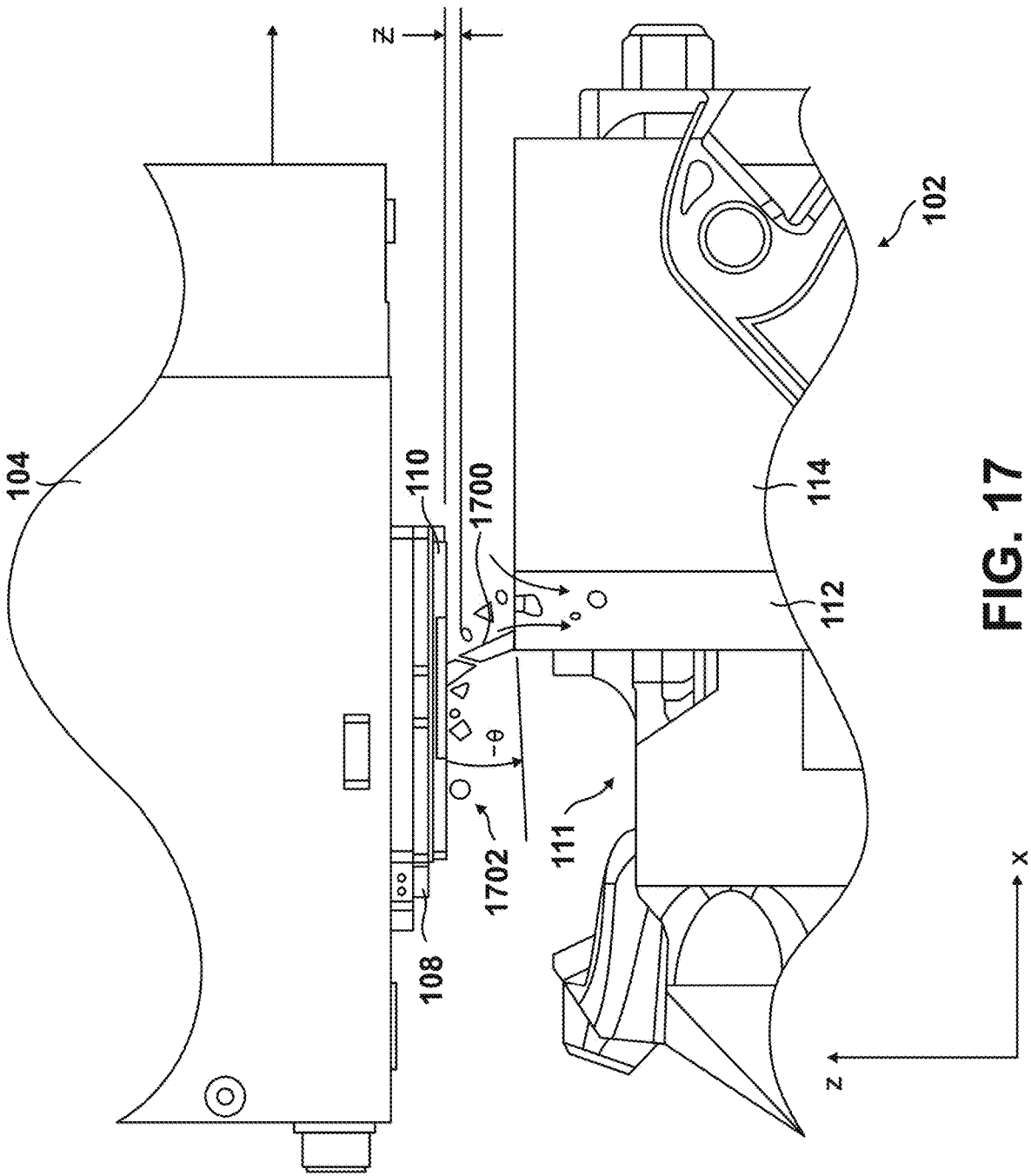
FIG. 17 is an illustration of a portion of the service station with a precision blade coupled thereto, according to some aspects of the disclosure.

FIG. 17 is an illustration of a portion of the service station 102 with a precision blade 1700 coupled thereto, according to some aspects of the disclosure. The service station 102 could incorporate the precision blade 1700 or squeegee (not shown—but would occupy the same location as the precision blade 1700) for scraping solid contaminants 1702 from the face of the print head 108. The precision blade 1700 would have an edge located near, but not touching, the jetting faces. A gap (z), for example of about 0.005 inches, may be present between the jetting face and the edge of the precision blade 1700, as shown in the example of FIG. 17.

The most appropriate offset distance may be slightly less than the average diameter of a particulate of the printed substrate (powder) but that would likely be impractical from a manufacturing and assembly standpoint. The precision blade 1700 would ideally be a soft material to mitigate risk of damage but would likely need to be either a precision ground steel or ceramic to maintain the gap to the print head 108 long term. The precision blade 1700 (e.g., a knife) may be a thin blade or a thicker section with a vertical or slightly negatively raked angle (as shown in FIG. 17) relative to the direction of travel of the print head 108. An assumption may be that powder adhered to the print head 108 will separate as a lump rather than be sheared across the grains. However, if the adhered powder masses are sheared in two pieces by action of the precision blade 1700, one piece attached to the print head 108 and the other piece being removed; rather than pulling them of as an agglomerate off the face of the print head 108, then the effect could be worse than the problem as the mass that stayed attached to the face of the print head 108 would likely be compressed into the jet nozzles as the print head 108 traveled past the vacuum knife assembly 112. Jetting as the blade passes under the print head 108 may provide sufficient pressure in the jets to assist in the cleaning action and prevent particulates from entering the jet nozzles.

Figure 18:
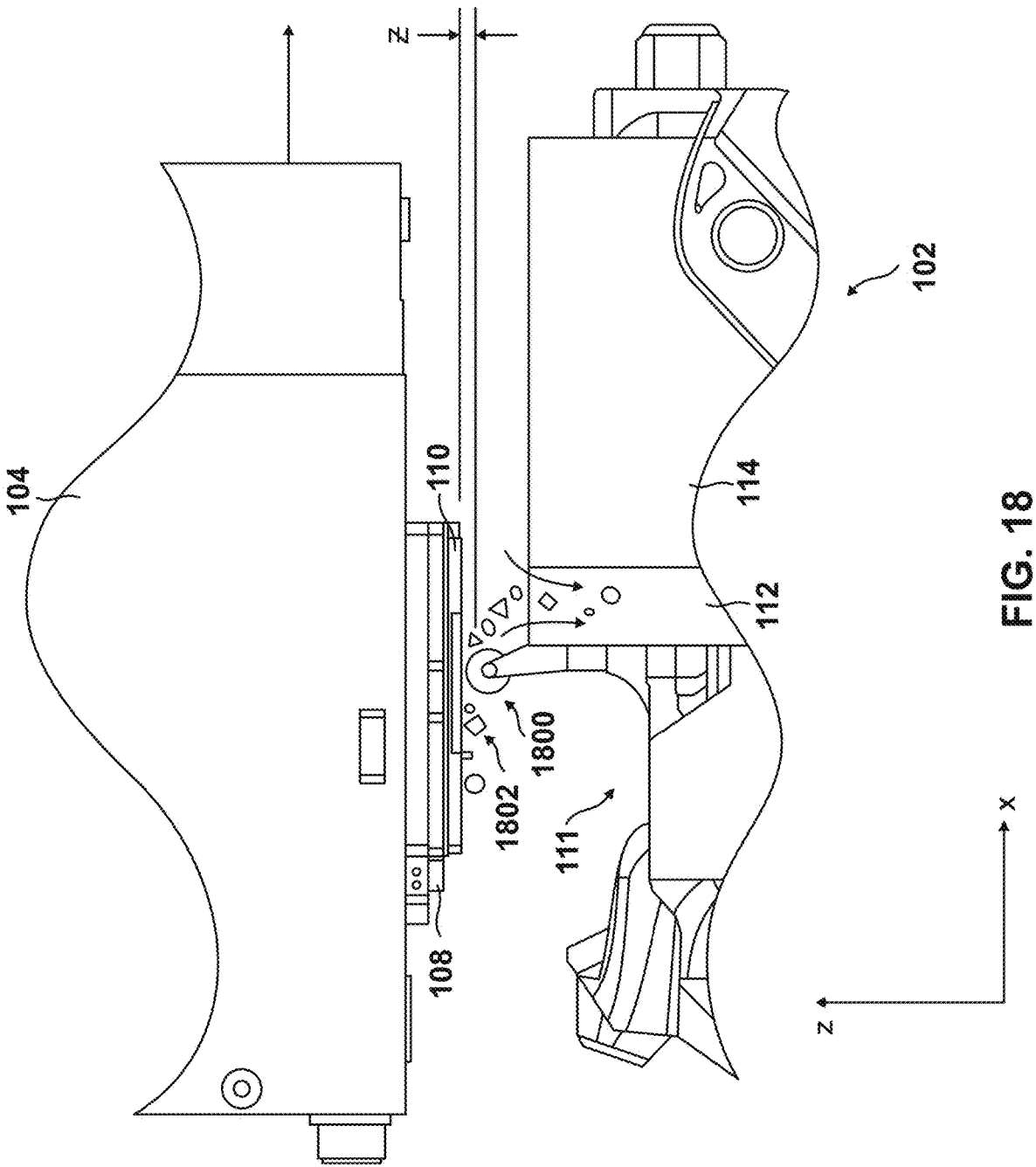
FIG. 18 is an illustration of the portion of the service station of FIG. 17, where the precision blade is replaced with a foam roller, according to some aspects of the disclosure.

FIG. 18 is an illustration of the portion of the service station 102 of FIG. 17, where the precision blade 1700 is replaced with a foam roller 1800, according to some aspects of the disclosure. As opposed to a rigid precision blade 1700 (e.g., a rigid knife, a rigid scraper blade), the service station 102 could incorporate a foam roller 1800 to gently remove debris 1802 from the face of the nozzle plate 110 of the print head 108.

Alternatively, a two-roller "almost contact" system may be substituted for the foam roller 1800 illustrated in FIG. 18. In some examples, the first roller may be a porous, dense foam, supplied axially with a fresh stream of washing fluid to loosen and residual debris on the face of the print head 108 with a minimal shear from low friction, lubricated foam, or a purely liquid surface. A second roller, located between the first roller and the build bed 120, FIG. 1) may be adjusted to be almost in contact with the face of the print head 108 and may be made of a strongly wicking material, configured to pull any droplets of ink/binder, particles, or washing fluid off the face of the print head 108. Additional suction can be provided through the second roller by having the vacuum knife assembly 112 remove liquid in this roller while sucking any particles off the surface of the print head 108. An additional vacuum knife (not shown) may be applied anywhere in this process to remove debris or liquid from the face of the head. When utilizing the two-roller (not shown to avoid cluttering the drawing) or the foam roller 1800 of FIG. 18, the print head may or may not configured to spit droplets from the nozzles into the spittoon assembly 111 at any point before, during, and/or after cleaning by the alternative two-roller almost contact feature.

Figure 19:
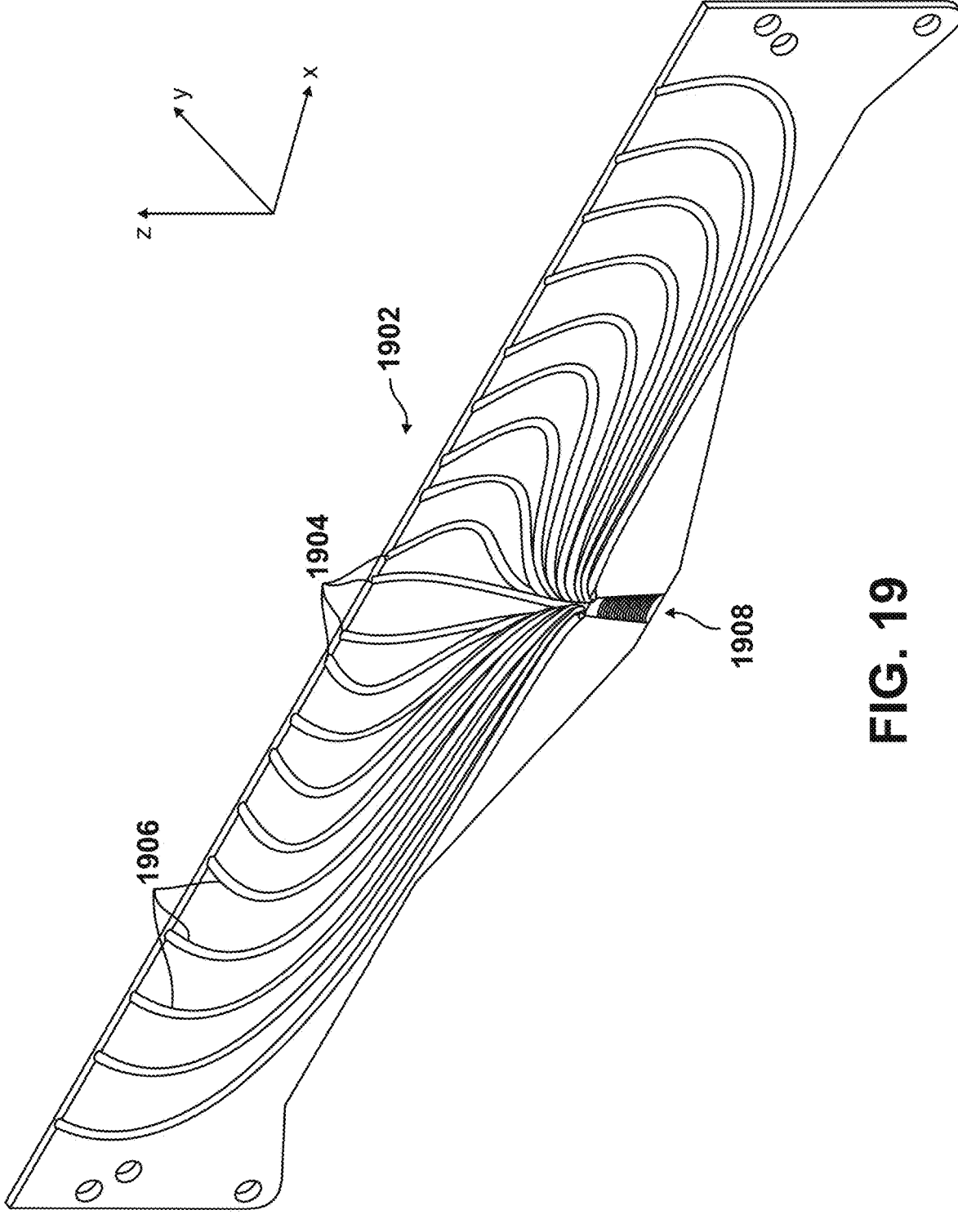
FIG. 19 is an illustration of a manifold of the vacuum knife assembly, according to some aspects of the disclosure.

FIG. 19 is an illustration of one-half of a manifold 1902 (sometimes referred to herein as a vacuum body) of the vacuum knife assembly 112 according to some aspects of the disclosure. The manifold 1902 was divided into two halves by bisecting a complete manifold in the x-z plane. In other words, the illustration of FIG. 19 is one-half (specifically a left half relative to the x-y-z coordinate system associated with FIG. 19) of a complete manifold 1902. However, it is noted that the manifold 1902 is not required to be manufactured in halves. In fact, in terms of ease of optimizing a configuration and dimensioning of the plurality of channels 1906 (three of twenty identified by reference number), manifolds described herein may be manufactured as one piece using a 3D additive manufacturing process.

References to the manifold 1902 are references to either the one half shown in FIG. 19 or a complete manifold (not shown) and should be apparent from the context of the description.

The manifold 1902 includes a plurality of vacuum apertures 1904 (four of twenty identified by reference number). As used herein, a vacuum aperture may refer to an opening defined by a sidewall in a body of the manifold 1902 (e.g., in a sidewall of a channel leading to the opening of the vacuum aperture 1904. The manifold 1902 also includes a vacuum source port 1908. The plurality of channels 1906 couple the plurality of vacuum apertures 1904 to the vacuum source port 1908. Reference to the plurality of vacuum apertures 1904 encompasses both a single vacuum aperture and a plurality of vacuum apertures. Reference to the plurality of channels 1906 encompasses both a single channel and a plurality of channels.

By use of the additive manufacturing process, the topology (e.g., placement, length, diameter, internal volume, etc.) of the plurality of vacuum channels 1906 may be easily changed to improve and/or optimized passive metering of a vacuum to each of the plurality of vacuum apertures 1904, and therefore to each print head (108, FIG. 1) coupled to any one or more of the plurality of vacuum apertures 1904. The additive manufacturing methods may allow iterative changes to be made to the topology of the manifold 1902 where each change may improve a balance between the pressure losses realized between the vacuum source port 1908 and a given vacuum aperture 1904 under each print head (e.g., 108, FIG. 1). Improved consistency of cleaning fluid removal after servicing could be achieved by using the topology-optimized vacuum channels 1906 in the manifold 1902.

In one example, the vacuum source may be split with a variety of gates (e.g., one gate per channel 1906) that may be adjusted/iterated to balance the amount of suction applied to each print head (108, FIG. 1). However, using the manifold 1902 exemplified in FIG. 19, having a plurality of topology-optimized channels 1906 between the vacuum source port 1908 and each given vacuum aperture 1904 under (or associated with) each given print head could improve the balance of the vacuum across the length and width of the vacuum knife assembly 112. Doing so would add little or no additional cost to an additively manufactured manifold 1902.

Accordingly, in examples described herein, the apparatus (100, FIG. 1) or more specifically a service station (102, FIG. 1) may include a vacuum knife assembly 112. The vacuum knife assembly 112 may include a manifold 1902 coupling a plurality of vacuum apertures 1904 to a vacuum source port 1908 via a plurality of topology-optimized channels 1906. According to some examples, there may be a one-to-one correspondence between a first quantity of the plurality of vacuum apertures 1904 and a second quantity of the plurality of topology-optimized channels 1906. According to some aspects, the topology-optimized channels 1906 may be dimensionally optimized to produce a balanced vacuum pressure at each of the plurality of vacuum apertures 1904.

In some examples, the manifold 1902 may be configured to be removed from the service station 102. In some examples a replacement manifold, identical to the manifold 1902 may be configured to replace the manifold 1902 in response to any one or more of the plurality of vacuum apertures 1904 becoming at least one of: clogged, or blocked. As used herein, a clogged vacuum aperture 1904 may have a foreign object (not shown) occupying a space within at least one topology-optimized channel 1906, and a blocked vacuum aperture 1904 may have the foreign object (not shown) external to the topology-optimized channel 1906 and adjacent to an opening of a vacuum aperture 1904. For convenience and efficient operation, the manifold 1902 may be configured to be removed from the vacuum knife assembly 112 and cleaned separately from the apparatus (e.g., the 3D printer 100, overall) or from the service station 102.

Figure 20:
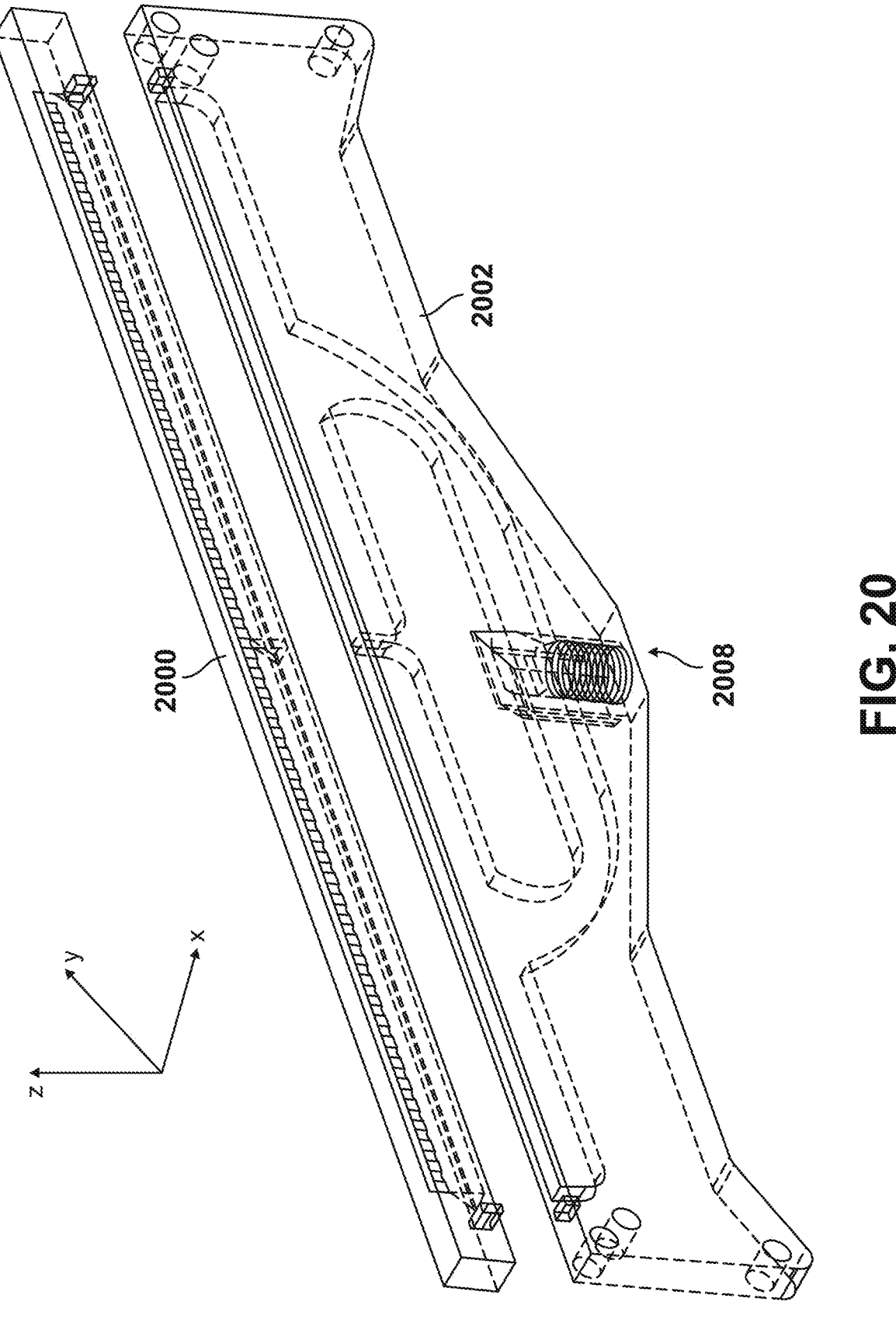
FIG. 20 is an illustration of an aperture plate coupled to an additively manufactured vacuum body, to improve manufacturability and ongoing maintenance of the vacuum knife assembly, according to some aspects of the disclosure.

FIG. 20 is an illustration of an aperture plate 2000 coupled to a second manifold 2002, different from the manifold 1902 as shown and described in connection with FIG. 19. The second manifold 2002 divides the channels coupled to a vacuum source port 2008 into two channels as opposed to twenty channels. Any number of channels is within the scope of this disclosure.

The additively manufactured second manifold 2002 (sometimes referred to as a vacuum body) and aperture plate 2000 may improve manufacturability and ongoing maintenance of the vacuum knife assembly 112, according to some aspects of the disclosure. In some examples, adhered powder may form on, for example, a face of the nozzle plate 110 or on some other surface of the print head assembly 104. The term adhered powder may be used to refer to powder particles that have stuck or become attached to a surface. In other words, the particulate has adhered to something on the surface, or the surface itself, and has formed a layer or coating on the surface. In the context of manufacturing, and more specifically in the context of 3D printing (e.g., 3D additive manufacturing) and in powder coating applications in general, adhered powder refers to powder particles that have stuck to the surface of a part or the surface of some part of the 3D printer, during the process of fabricating a part. This can be due to various factors like the heat generated during printing, the flow of gases, or the properties of the powder, the binder liquid, or the ink liquid being used in the printing process. In general, as used herein, any powder or liquid that is not a part of the thing being manufactured may be referred to as debris herein. The adhered powder or a piece of it may be drawn into the vacuum knife assembly 112 by the power of the vacuum (e.g., by the negative pressure drawing solid matter and liquid droplets into the vacuum knife assembly 112).

The adhered powder or a piece of the adhered powder may clog one or more of the plurality of vacuum apertures 1904 (FIG. 19) or the plurality of apertures in the aperture plate 2000. Clogging or blocking of any of the plurality of vacuum apertures 1904 or any of the apertures in the aperture plate 2000 may prevent the surface of the nozzle plate 110 of the print head 108 from being dried in the region of the clogged vacuum aperture(s). Additionally or alternatively, any clogging or blocking of any of the plurality of apertures may prevent debris from being vacuumed off the surface of the nozzle plate 110 at or in the vicinity of the clogged vacuum aperture(s). The lack of drying and or the lack of debris removal may negatively affect print performance.

It is also difficult to open a blocked or clogged vacuum aperture 1904 or an aperture of the aperture plate 2000 after the clogging or blocking due to the narrowness/small diameter of the openings. Additionally, there may be guide gates (not shown) near the top of the apertures(s) that are also narrow. Attempting to clean out a clog or remove a blockage may result in pushing the clog or blockage further into the vacuum aperture 1904 (FIG. 19) or the aperture plate 2000.

This may be mitigated by creating the durable aperture plate 2000 that may be attached to a top of the second manifold 2002 with the appropriate aperture slit(s) incorporated into the aperture plate 2000. Utilizing the aperture plate 2000 may allow the increase of gate size below the aperture plate 2000 since the vacuum will be concentrated at the aperture. Increasing gate size and metering at the aperture plate 2000 may also help balance the amount of vacuum at each print head.

Cleaning the aperture plate 2000 may be simplified by allowing the aperture plate 2000 to be removed and cleaned separately (or replaced with a new, clean, aperture plate). Debris that enters the aperture plate 2000 may be periodically flushed out with cleaning fluid and separated from the vacuum system by an integral or external wet separator system. This effect may be improved further by making individual apertures for each print head 108 in an offset (staggered) configuration similar to the weirs (802, FIG. 8) of the non-contact wash assembly 114 of the service station 102. Appropriate sealing by a gasket with cutouts for hard stops in the top of the second manifold 2002 may ensure that the vacuum knife assembly 112 could be coupled to the print head 108 with good flatness and vacuum seal.

Of course, in the above examples, the circuitry included in the one or more processors 116 of FIG. 1 is merely provided as an example. Other means for carrying out the described processes or functions may be included within various aspects of the present disclosure, including but not limited to the instructions stored in/on the one pr more memories 126 and/or the one or more computer-readable medium 136 of FIG. 1 or any other suitable apparatus or means described in any one of FIGS. 1-20 utilizing, for example, the processes and/or algorithms described herein.

Several aspects of 3D printing systems have been presented with reference to exemplary implementations. As those persons having ordinary skill in the art will readily appreciate, various aspects described throughout this disclosure may be extended to other 3D printing systems.

The following provides an overview of aspects of the present disclosure.

Aspect 1: An apparatus configured as a three-dimensional (3D) printer, comprising: a print head assembly comprising a print head and a nozzle plate, the nozzle plate configured to dispense droplets of liquid provided from the print head; a build bed configured to receive at least some of the droplets from the nozzle plate; and a service station, comprising: a spittoon assembly configured to receive at least some of the droplets from the nozzle plate; a vacuum knife assembly configured to remove at least one of: debris, or at least some of the droplets from a surface of the nozzle plate; and a non-contact wash assembly comprising a plurality of weirs configured to upwell a washing fluid and immersively receive the nozzle plate in the washing fluid.

Aspect 2: The apparatus of aspect 1, wherein the build bed is spaced apart from the service station along an x-axis passing perpendicularly through the build bed and the service station, the apparatus further comprising: a gantry coupled to the print head assembly and configured to traverse the print head assembly in a first direction along the x-axis from a first location on the x-axis to a second location on the x-axis, the second location different from the first location and the second location over the build bed, and to traverse the print head assembly in a second direction, opposite to the first direction, along the x-axis to a third location on the x-axis, distal from the second location and over at least one of: the spittoon assembly, the vacuum knife assembly, or the non-contact wash assembly of the service station, wherein the third location is equal to the first location or the first location is between the build bed and the service station.

Aspect 3: The apparatus of aspect 1 or 2, wherein the vacuum knife assembly comprises a manifold coupling a plurality of vacuum apertures to a vacuum source port via a plurality of topology-optimized channels.

Aspect 4: The apparatus of aspect 3, wherein there is a one-to-one correspondence between a first quantity of the plurality of vacuum apertures and a second quantity of the plurality of topology-optimized channels.

Aspect 5: The apparatus of any of aspects 1 through 4, wherein the topology-optimized channels are dimensionally optimized to produce a balanced vacuum pressure at each of the plurality of vacuum apertures.

Aspect 6: The apparatus of any of aspects 1 through 5, wherein the manifold is configured to be removed from the apparatus.

Aspect 7: The apparatus of any of aspects 1 through 6, wherein a replacement manifold, identical to the manifold is configured to replace the manifold in response to any one or more of the plurality of vacuum apertures becoming at least one of: clogged, or blocked.

Aspect 8: The apparatus of aspect 7, wherein a clogged vacuum aperture has a foreign object occupying a space within at least one topology-optimized channel, and a blocked vacuum aperture has the foreign object external to the topology-optimized channel and adjacent to an opening of a vacuum aperture.

Aspect 9: The apparatus of any of aspects 1 through 8, wherein the manifold is configured to be removed from the vacuum knife assembly and cleaned separate from the apparatus.

Aspect 10: The apparatus of any of aspects 1 through 9, wherein the spittoon assembly includes an aerosol coalescing geometry configured to receive and contain (e.g., capture) droplets ejected from (e.g., spit from) the nozzle plate of the print head during service at the service station.

Aspect 11: The apparatus of aspect 10, wherein the aerosol coalescing geometry includes an opening configured to receive droplets ejected from the nozzle plate within a mist.

Aspect 12: the Apparatus of any of Aspects 1 through 11, Wherein the Mist Is a mist of cleaning fluid.

Aspect 13: The apparatus of any of aspects 1 through 12, wherein the droplets are mixed with the mist, collect at a bottom of the spittoon assembly, and are drained from the bottom of the spittoon assembly via a drain.

Aspect 14: The apparatus of any of aspects 1 through 13, wherein the droplets are mixed with the mist, pass through a filter, collect at a bottom of the spittoon assembly, and are drained from the bottom of the spittoon assembly via a drain.

Aspect 15: The apparatus of any of aspects 1 through 14, further comprising: an aerosol delivery device configured to spray a fan of cleaning fluid across a surface of the nozzle plate during cleaning at the service station.

Aspect 16: The apparatus of aspect 15, wherein the aerosol delivery device is further configured to wash internal structures of the service station to reduce a buildup of binder residue and particulate accumulation on components and reduce reliance on operator cleaning.

One or more of the components, steps, features, and/or functions illustrated in FIGS. 1-20 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based on design preferences, it is understood that the specific order or hierarchy of steps in the methods may be rearranged. The method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein the reference to an element in the singular is not intended to mean "one and only one" unless specifically so stated, but rather "one or more" or "at least one." Unless specifically stated otherwise, the term "some" refers to one or more.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein but are to be accorded the widest scope consistent with this disclosure, the principles, and the novel features disclosed herein.

Additionally, various features that are described in this specification in the context of separate examples can also be implemented in combination in a single implementation. Conversely, various features that are described in the context of a single implementation can also be implemented in multiple examples separately or in any suitable subcombination. As such, although features may be described above as acting in particular combinations, and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order or that all illustrated operations be performed to achieve desirable results. Further, the drawings may schematically depict one or more example processes in the form of a flowchart or flow diagram. However, other operations that are not depicted can be incorporated into the schematically illustrated example processes. For example, one or more additional operations can be performed before, after, simultaneously, or between any of the illustrated operations. In some circumstances, multitasking and parallel processing may be advantageous.

What is claimed is:

1. An apparatus configured as a three-dimensional (3D) printer, comprising:
   a print head assembly comprising a print head and a nozzle plate, the nozzle plate configured to dispense droplets of liquid provided from the print head;
   a build bed configured to receive at least some of the droplets from the nozzle plate; and
   a service station, comprising:
      a spittoon assembly configured to receive at least some of the droplets from the nozzle plate;
      a vacuum knife assembly configured to remove at least one of: debris, or at least some of the droplets from a surface of the nozzle plate; and
      a non-contact wash assembly comprising a plurality of weirs configured to upwell a washing fluid and immersively receive the nozzle plate in the washing fluid.

2. The apparatus of claim 1, wherein the build bed is spaced apart from the service station along an x-axis passing perpendicularly through the build bed and the service station, the apparatus further comprising:
   a gantry coupled to the print head assembly and configured to traverse the print head assembly in a first direction along the x-axis from a first location on the x-axis to a second location on the x-axis, the second location different from the first location and the second location over the build bed, and to traverse the print head assembly in a second direction, opposite to the first direction, along the x-axis to a third location on the x-axis, distal from the second location and over at least one of: the spittoon assembly, the vacuum knife assembly, or the non-contact wash assembly of the service station, wherein the third location is equal to the first location or the first location is between the build bed and the service station.

3. The apparatus of claim 1, wherein the vacuum knife assembly comprises a manifold coupling a plurality of vacuum apertures to a vacuum source port via a plurality of topology-optimized channels.

4. The apparatus of claim 3, wherein there is a one-to-one correspondence between a first quantity of the plurality of vacuum apertures and a second quantity of the plurality of topology-optimized channels.

5. The apparatus of claim 3, wherein the plurality of topology-optimized channels are dimensionally optimized to produce a balanced vacuum pressure at each of the plurality of vacuum apertures.

6. The apparatus of claim 3, wherein the manifold is configured to be removed from the apparatus.

7. The apparatus of claim 3, wherein a replacement manifold, identical to the manifold is configured to replace the manifold in response to any one or more of the plurality of vacuum apertures becoming at least one of: clogged, or blocked.

8. The apparatus of claim 7, wherein a clogged vacuum aperture has a foreign object occupying a space within at least one of the plurality of topology-optimized channels, and a blocked vacuum aperture has the foreign object external to a given topology-optimized channel and adjacent to an opening of a vacuum aperture.

9. The apparatus of claim 3, wherein the manifold is configured to be removed from the vacuum knife assembly and cleaned separate from the apparatus.

10. The apparatus of claim 1, wherein the spittoon assembly includes an aerosol coalescing geometry configured to receive and contain droplets ejected from the nozzle plate during service.

11. The apparatus of claim 10, wherein the aerosol coalescing geometry includes an opening configured to receive the droplets ejected from the nozzle plate within a mist.

12. The apparatus of claim 11, wherein the mist is a mist of cleaning fluid.

13. The apparatus of claim 11, wherein the droplets are mixed with the mist, collect at a bottom of the spittoon assembly, and are drained from the bottom of the spittoon assembly via a drain.

14. The apparatus of claim 11, wherein the droplets are mixed with the mist, pass through a filter, collect at a bottom of the spittoon assembly, and are drained from the bottom of the spittoon assembly via a drain.

15. The apparatus of claim 1, further comprising:

an aerosol delivery device configured to spray a fan of cleaning fluid across the surface of the nozzle plate during cleaning at the service station.

16. The apparatus of claim 15, wherein the aerosol delivery device is further configured to wash internal structures of the service station to reduce a buildup of binder residue and particulate accumulation on components and reduce reliance on operator cleaning.

* * * * *